United States Patent
Park et al.

(10) Patent No.: US 12,004,056 B2
(45) Date of Patent: Jun. 4, 2024

(54) METHOD AND APPARATUS FOR CONFIGURING SL DRX PATTERN TO SOLVE THE HALF-DUPLEX PROBLEM IN NR V2X

(71) Applicant: LG ELECTRONICS INC., Seoul (KR)

(72) Inventors: Giwon Park, Seoul (KR); Seungmin Lee, Seoul (KR); Woosuk Ko, Seoul (KR); Seoyoung Back, Seoul (KR); Jongwoo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 323 days.

(21) Appl. No.: 17/457,617

(22) Filed: Dec. 3, 2021

(65) Prior Publication Data

US 2022/0272507 A1   Aug. 25, 2022

(30) Foreign Application Priority Data

Oct. 23, 2020  (KR) .................. 10-2020-0138417
Dec. 1, 2020   (KR) .................. 10-2020-0165395

(51) Int. Cl.
*H04W 4/00*   (2018.01)
*H04W 4/40*   (2018.01)
*H04W 52/02*  (2009.01)

(52) U.S. Cl.
CPC ......... *H04W 4/40* (2018.02); *H04W 52/0229* (2013.01)

(58) Field of Classification Search
CPC .......................... H04W 4/40; H04W 52/0229
See application file for complete search history.

(56) References Cited

U.S. PATENT DOCUMENTS

2020/0275474 A1*  8/2020  Chen ................. H04L 1/1848
2020/0367167 A1* 11/2020  Nam ................ H04W 52/0229
2021/0144797 A1*  5/2021  Zhang ................ H04W 76/28

OTHER PUBLICATIONS

3rd Generation Partnership Project, "Technical Specification Group Radio Access Network; NR; Physical layer procedures for control (Release 16)," 3GPP TS 38.213 V16.0.0, Dec. 2019, 11 pages.

* cited by examiner

*Primary Examiner* — Erika A Washington
(74) *Attorney, Agent, or Firm* — LEE, HONG, DEGERMAN, KANG & WAIMEY

(57) ABSTRACT

A method of operating a first apparatus 100 in a wireless communication system is proposed. The method may comprise: determining a time duration in which a first active time and a second active time overlap; performing SL transmission or SL reception of a service related to a smaller priority value among a first priority value and a second priority value, within the overlapping time duration; and performing SL transmission or SL reception of a service related to a greater priority value among the first priority value and the second priority value, outside the overlapping time duration.

15 Claims, 20 Drawing Sheets

METHOD AND APPARATUS FOR CONFIGURING SL DRX PATTERN TO SOLVE THE HALF-DUPLEX PROBLEM IN NR V2X

CROSS-REFERENCE TO RELATED APPLICATIONS

Pursuant to 35 U.S.C. § 119 (a), this application claims the benefit of an earlier filing date and right of priority to Korean Patent Application Nos. 10-2020-0138417 filed on Oct. 23, 2020, and 10-2020-0165395 filed on Dec. 1, 2020, the contents of all of which are hereby incorporated by reference herein in their entireties.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY OF THE DISCLOSURE

Technical Solutions

According to an embodiment, a method of operating a first apparatus 100 in a wireless communication system is proposed. The method may comprise: determining a time duration in which a first active time and a second active time overlap; performing SL transmission or SL reception of a service related to a smaller priority value among a first priority value and a second priority value, within the overlapping time duration; and performing SL transmission or SL reception of a service related to a greater priority value among the first priority value and the second priority value, outside the overlapping time duration.

Effects of the Disclosure

The user equipment (UE) may efficiently perform retransmission based on hybrid automatic repeat request (HARD) feedback.

DESCRIPTION OF EXEMPLARY EMBODIMENTS

Figure 1:
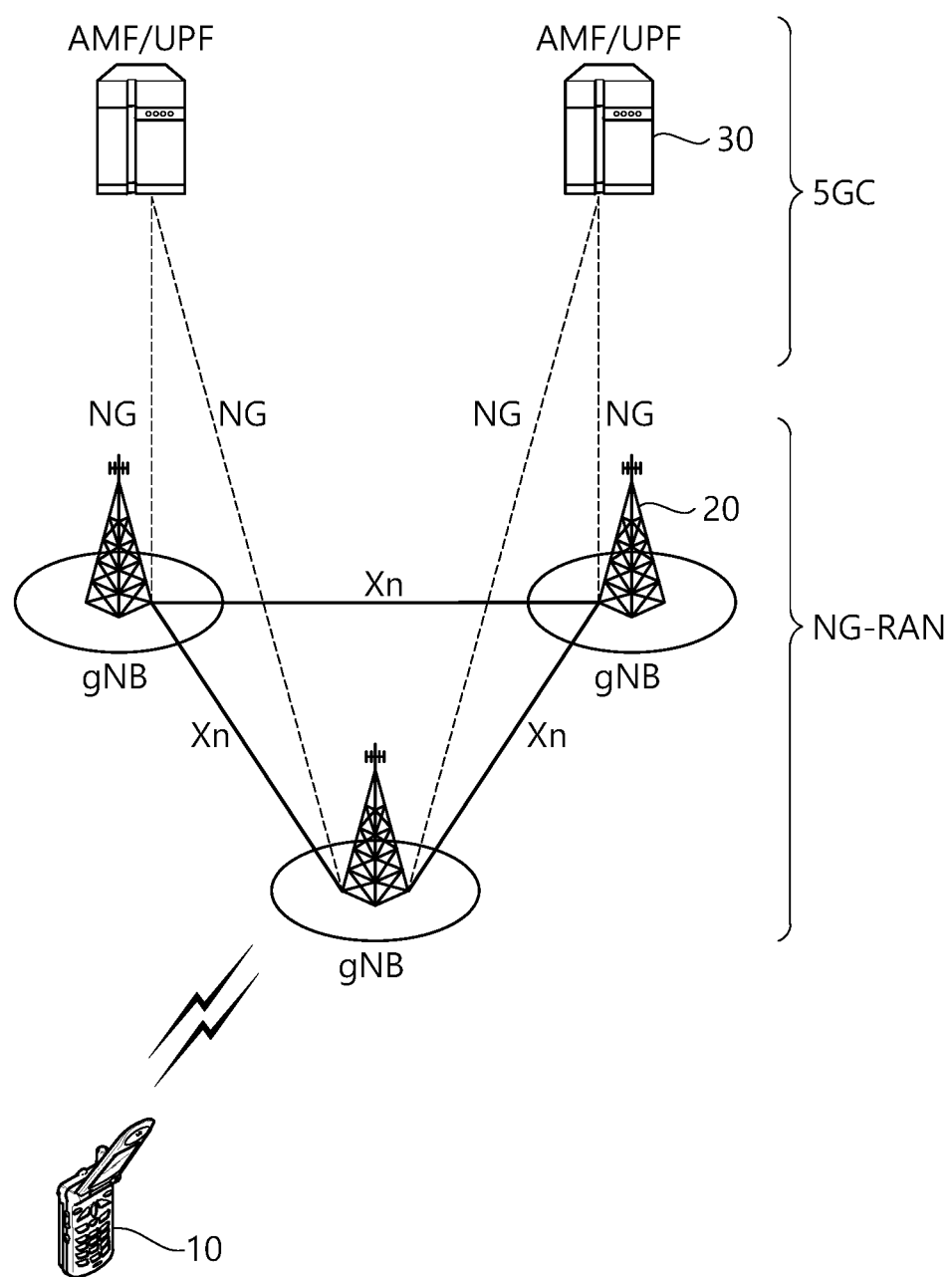
FIG. 1 shows a structure of an NR system, based on an embodiment of the present disclosure.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDDCH" may be proposed as an example of the "control information". In addition, when indicated as "control information (i.e., PDCCH)", it may also mean that "PDCCH" is proposed as an example of the "control information".

In the following description, 'when, if, or in case of' may be replaced with 'based on'.

A technical feature described individually in one figure in the present disclosure may be individually implemented, or may be simultaneously implemented.

In the present disclosure, a higher layer parameter may be a parameter which is configured, pre-configured or pre-defined for a UE. For example, a base station or a network may transmit the higher layer parameter to the UE. For example, the higher layer parameter may be transmitted through radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

For terms and techniques not specifically described among terms and techniques used in this specification, reference may be made to the wireless communication standard document published before the present specification is filed.

FIG. 1 shows a structure of an NR system, based on an embodiment of the present disclosure. The embodiment of FIG. 1 may be combined with various embodiments of the present disclosure.

Referring to FIG. 1, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 1 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
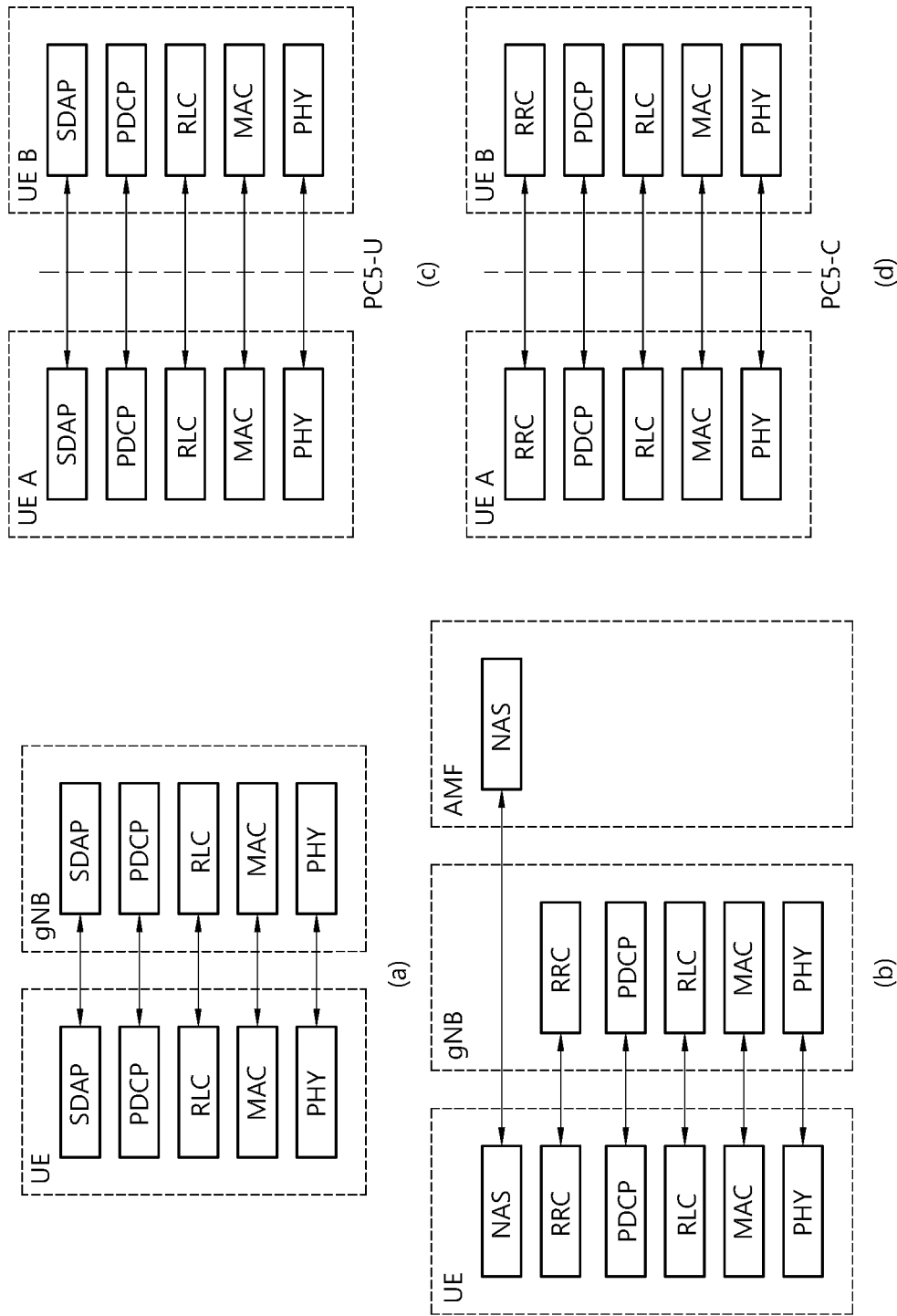
FIG. 2 shows a radio protocol architecture, based on an embodiment of the present disclosure.

FIG. 2 shows a radio protocol architecture, based on an embodiment of the present disclosure. The embodiment of FIG. 2 may be combined with various embodiments of the present disclosure. Specifically, (a) of FIG. 2 shows a radio protocol stack of a user plane for Uu communication, and (b) of FIG. 2 shows a radio protocol stack of a control plane for Uu communication. (c) of FIG. 2 shows a radio protocol stack of a user plane for SL communication, and (d) of FIG. 2 shows a radio protocol stack of a control plane for SL communication.

Referring to FIG. 2, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 3:
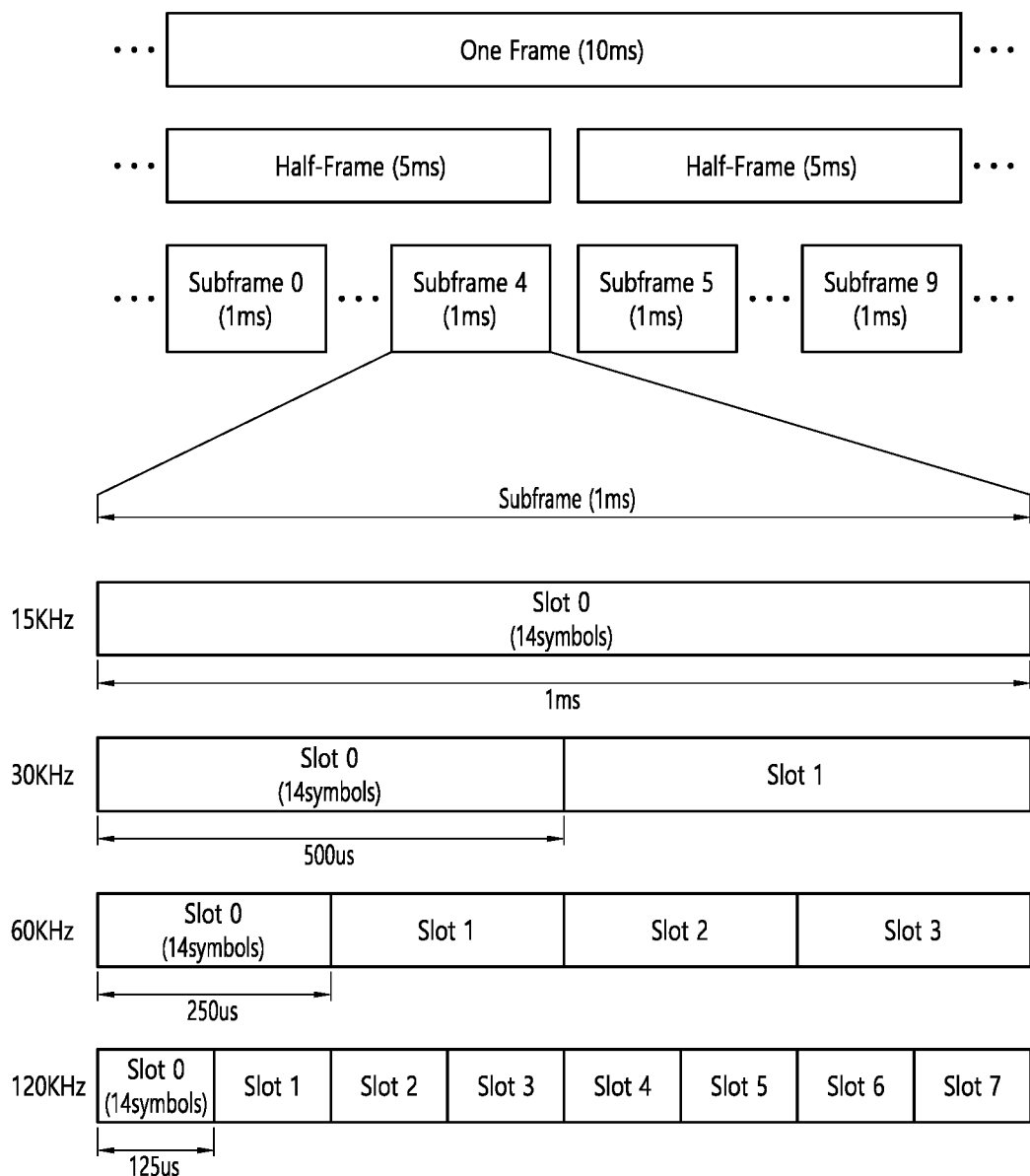
FIG. 3 shows a structure of a radio frame of an NR, based on an embodiment of the present disclosure.

FIG. 3 shows a structure of a radio frame of an NR, based on an embodiment of the present disclosure. The embodiment of FIG. 3 may be combined with various embodiments of the present disclosure.

Referring to FIG. 3, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS (15*2$^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15*2$^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 4:
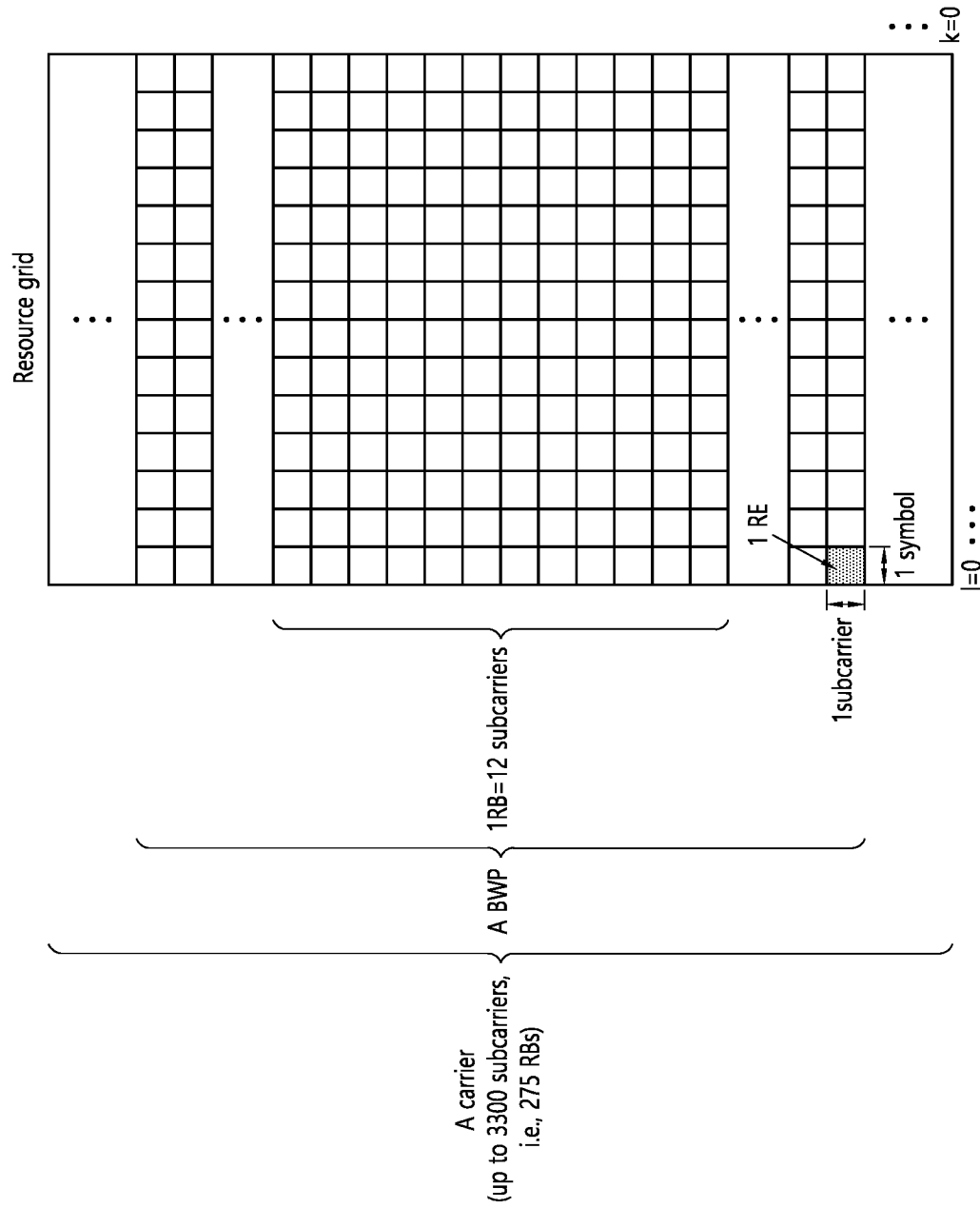
FIG. 4 shows a structure of a slot of an NR frame, based on an embodiment of the present disclosure.

FIG. 4 shows a structure of a slot of an NR frame, based on an embodiment of the present disclosure. The embodiment of FIG. 4 may be combined with various embodiments of the present disclosure.

Referring to FIG. 4, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information—reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 5:
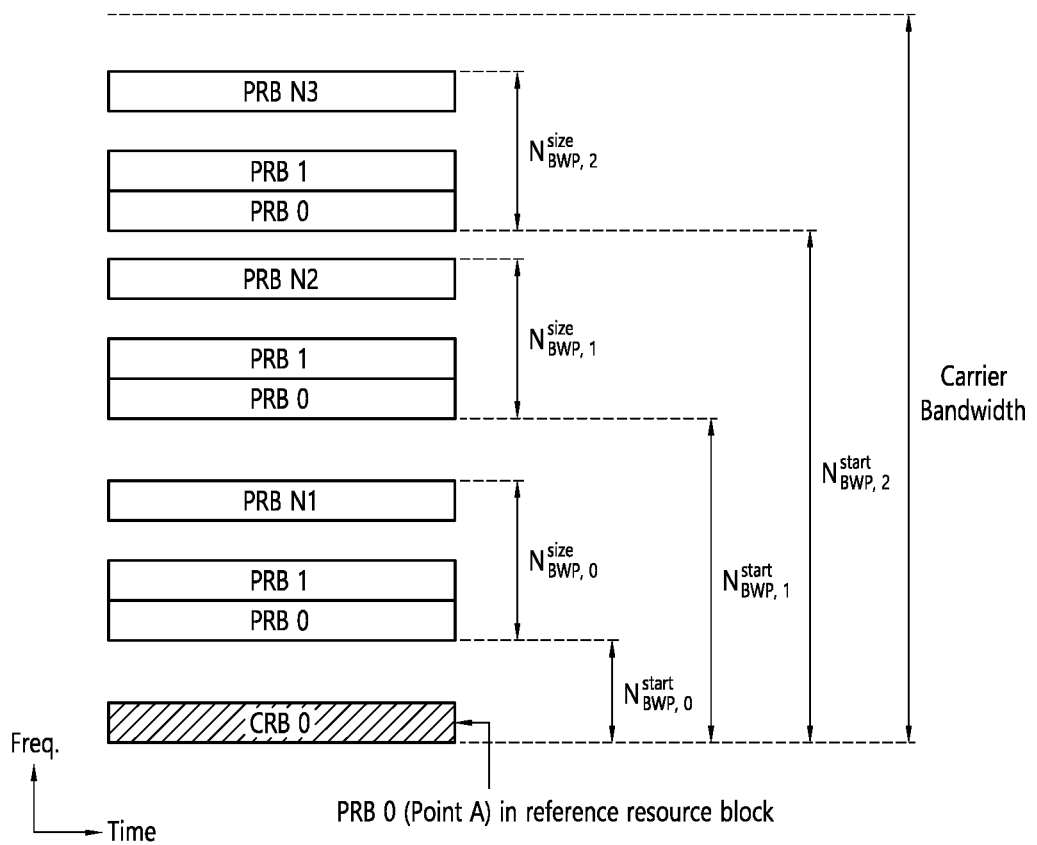
FIG. 5 shows an example of a BWP, based on an embodiment of the present disclosure.

FIG. 5 shows an example of a BWP, based on an embodiment of the present disclosure. The embodiment of FIG. 5 may be combined with various embodiments of the present disclosure. It is assumed in the embodiment of FIG. 5 that the number of BWPs is 3.

Referring to FIG. 5, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 6:
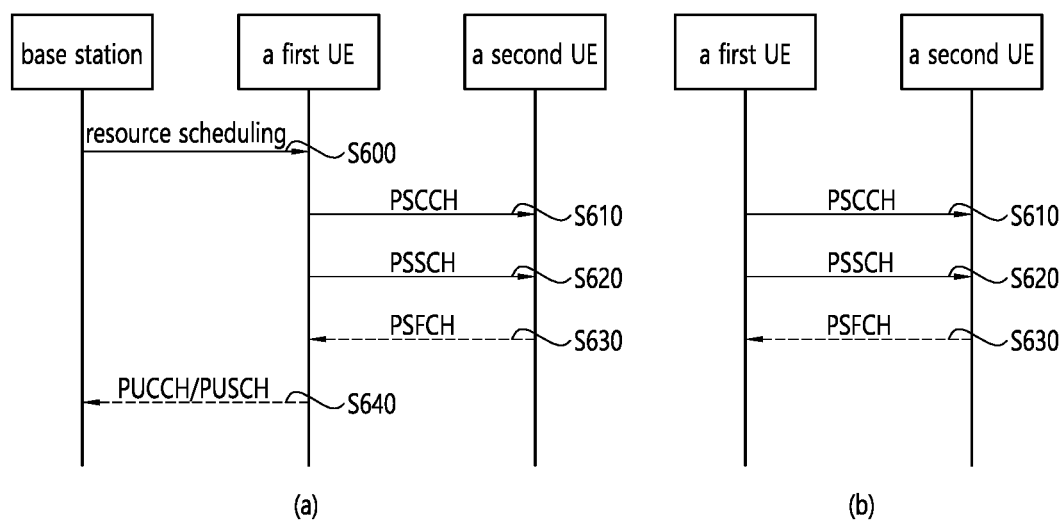
FIG. 6 shows a procedure of performing V2X or SL communication by a UE based on a transmission mode, based on an embodiment of the present disclosure.

FIG. 6 shows a procedure of performing V2X or SL communication by a UE based on a transmission mode, based on an embodiment of the present disclosure. The embodiment of FIG. 6 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 6 shows a UE operation related to an LTE transmission mode 1 or an LTE transmission mode 3. Alternatively, for example, (a) of FIG. 6 shows a UE operation related to an NR resource allocation mode 1. For example, the LTE transmission mode 1 may be applied to general SL communication, and the LTE transmission mode 3 may be applied to V2X communication.

For example, (b) of FIG. 6 shows a UE operation related to an LTE transmission mode 2 or an LTE transmission mode 4. Alternatively, for example, (b) of FIG. 6 shows a UE operation related to an NR resource allocation mode 2.

Referring to (a) of FIG. 6, in the LTE transmission mode 1, the LTE transmission mode 3, or the NR resource allocation mode 1, a base station may schedule SL resource(s) to be used by a UE for SL transmission. For example, in step S600, a base station may transmit information related to SL resource(s) and/or information related to UL resource(s) to a first UE. For example, the UL resource(s) may include PUCCH resource(s) and/or PUSCH resource(s). For example, the UL resource(s) may be resource(s) for reporting SL HARQ feedback to the base station.

For example, the first UE may receive information related to dynamic grant (DG) resource(s) and/or information related to configured grant (CG) resource(s) from the base station. For example, the CG resource(s) may include CG type 1 resource(s) or CG type 2 resource(s). In the present disclosure, the DG resource(s) may be resource(s) configured/allocated by the base station to the first UE through a downlink control information (DCI). In the present disclosure, the CG resource(s) may be (periodic) resource(s) configured/allocated by the base station to the first UE through a DCI and/or an RRC message. For example, in the case of the CG type 1 resource(s), the base station may transmit an RRC message including information related to CG resource(s) to the first UE. For example, in the case of the CG type 2 resource(s), the base station may transmit an RRC message including information related to CG resource(s) to the first UE, and the base station may transmit a DCI related to activation or release of the CG resource(s) to the first UE.

In step S610, the first UE may transmit a PSCCH (e.g., sidelink control information (SCI) or $1^{st}$-stage SCI) to a second UE based on the resource scheduling. In step S620, the first UE may transmit a PSSCH (e.g., $2^{nd}$-stage SCI, MAC PDU, data, etc.) related to the PSCCH to the second UE. In step S630, the first UE may receive a PSFCH related to the PSCCH/PSSCH from the second UE. For example, HARQ feedback information (e.g., NACK information or ACK information) may be received from the second UE through the PSFCH. In step S640, the first UE may transmit/report HARQ feedback information to the base station through the PUCCH or the PUSCH. For example, the HARQ feedback information reported to the base station may be information generated by the first UE based on the HARQ feedback information received from the second UE. For example, the HARQ feedback information reported to the base station may be information generated by the first UE based on a pre-configured rule. For example, the DCI may be a DCI for SL scheduling. For example, a format of the DCI may be a DCI format 3_0 or a DCI format 3_1.

Referring to (b) of FIG. 6, in the LTE transmission mode 2, the LTE transmission mode 4, or the NR resource allocation mode 2, a UE may determine SL transmission resource(s) within SL resource(s) configured by a base station/network or pre-configured SL resource(s). For example, the configured SL resource(s) or the pre-configured SL resource(s) may be a resource pool. For example, the UE may autonomously select or schedule resource(s) for SL transmission. For example, the UE may perform SL communication by autonomously selecting resource(s) within the configured resource pool. For example, the UE may autonomously select resource(s) within a selection window by performing a sensing procedure and a resource (re)selection procedure. For example, the sensing may be performed in a unit of subchannel(s). For example, in step S610, a first UE which has selected resource(s) from a resource pool by itself may transmit a PSCCH (e.g., sidelink control information (SCI) or $1^{st}$-stage SCI) to a second UE by using the resource(s). In step S620, the first UE may transmit a PSSCH (e.g., $2^{nd}$-stage SCI, MAC PDU, data, etc.) related to the PSCCH to the second UE. In step S630, the first UE may receive a PSFCH related to the PSCCH/PSSCH from the second UE.

Referring to (a) or (b) of FIG. 6, for example, the first UE may transmit a SCI to the second UE through the PSCCH. Alternatively, for example, the first UE may transmit two consecutive SCIs (e.g., 2-stage SCI) to the second UE through the PSCCH and/or the PSSCH. In this case, the second UE may decode two consecutive SCIs (e.g., 2-stage SCI) to receive the PSSCH from the first UE. In the present disclosure, a SCI transmitted through a PSCCH may be referred to as a $1^{st}$ SCI, a first SCI, a $1^{st}$-stage SCI or a $1^{st}$-stage SCI format, and a SCI transmitted through a PSSCH may be referred to as a $2^{nd}$ SCI, a second SCI, a $2^{nd}$-stage SCI or a $2^{nd}$-stage SCI format. For example, the $1^{st}$-stage SCI format may include a SCI format 1-A, and the $2^{nd}$-stage SCI format may include a SCI format 2-A and/or a SCI format 2-B.

Referring to (a) or (b) of FIG. 6, in step S630, the first UE may receive the PSFCH. For example, the first UE and the second UE may determine a PSFCH resource, and the second UE may transmit HARQ feedback to the first UE using the PSFCH resource.

Referring to (a) of FIG. 6, in step S640, the first UE may transmit SL HARQ feedback to the base station through the PUCCH and/or the PUSCH.

Figure 7:
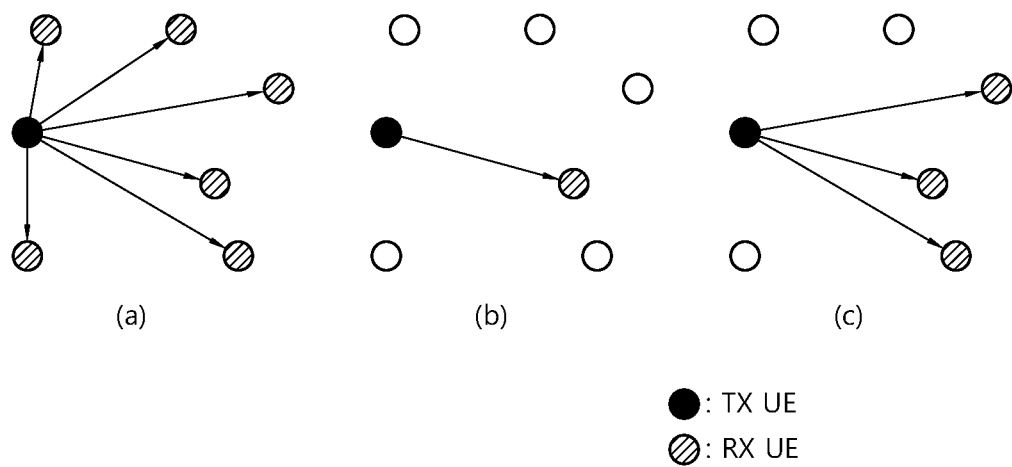
FIG. 7 shows three cast types, based on an embodiment of the present disclosure.

FIG. 7 shows three cast types, based on an embodiment of the present disclosure. The embodiment of FIG. 7 may be combined with various embodiments of the present disclosure. Specifically, (a) of FIG. 7 shows broadcast-type SL communication, (b) of FIG. 7 shows unicast type-SL communication, and (c) of FIG. 7 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

In this specification, the wording "configure or define" may be interpreted as being (pre)configured (via predefined signaling (e.g., SIB, MAC signaling, RRC signaling)) from a base station or a network. For example, "A may be configured" may include "that a base station or network (pre) configures/defines or informs A for a UE". Alternatively, the wording "configure or define" may be construed as being pre-configured or pre-defined by a system. For example, "A may be configured" may include "A is pre-configured/pre-defined by a system".

Referring to standard documents, some procedures and technical specifications related to the present disclosure are shown in Tables 5 to 8 below.

TABLE 5

| 3GPP TS 38.321 V16.2.1 |
| --- |
| The MAC entity may be configured by RRC with a DRX functionality that controls the UE's PDCCH monitoring activity for the MAC entity's C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, and AI-RNTI. When using DRX operation, the MAC entity shall also monitor PDCCH according to requirements found in other clauses of this specification. When in RRC_CONNECTED, if DRX is configured, for all the activated Serving Cells, the MAC entity may monitor the PDCCH discontinuously using the DRX operation specified in this clause; otherwise the MAC entity shall monitor the PDCCH as specified in TS 38.213 [6]. <br> NOTE 1: If Sidelink resource allocation mode 1 is configured by RRC, a DRX functionality is not configured. <br> RRC controls DRX operation by configuring the following parameters: <br>     drx-onDurationTimer: the duration at the beginning of a DRX cycle; <br>     drx-SlotOffset: the delay before starting the drx-onDurationTimer; <br>     drx-InactivityTimer: the duration after the PDCCH occasion in which a PDCCH indicates a new UL or DL transmission for the MAC entity; <br>     drx-RetransmissionTimerDL (per DL HARQ process except for the broadcast process): the maximum duration until a DL retransmission is received; <br>     drx-RetransmissionTimerUL (per UL HARQ process): the maximum duration until a grant for UL retransmission is received; <br>     drx-LongCycleStartOffset: the Long DRX cycle and drx-StartOffset which defines the subframe where the Long and Short DRX cycle starts; <br>     drx-ShortCycle (optional): the Short DRX cycle; <br>     drx-ShortCycleTimer (optional): the duration the UE shall follow the Short DRX cycle; <br>     drx-HARQ-RTT-TimerDL (per DL HARQ process except for the broadcast process): the minimum duration before a DL assignment for HARQ retransmission is expected by the MAC entity; <br>     drx-HARQ-RTT-TimerUL (per UL HARQ process): the minimum duration before a UL HARQ retransmission grant is expected by the MAC entity; <br>     ps-Wakeup (optional): the configuration to start associated drx-onDurationTimer in case DCP is monitored but not detected; <br>     ps-TransmitOtherPeriodicCSI (optional): the configuration to report periodic CSI that is not L1-RSRP on PUCCH during the time duration indicated by drx-onDurationTimer in case DCP is configured but associated drx-onDuration Timer is not started; <br>     ps-TransmitPeriodicL1-RSRP (optional): the configuration to transmit periodic CSI that is L1-RSRP on PUCCH during the time duration indicated by drx-onDurationTimer in case DCP is configured but associated drx-onDurationTimer is not started. |

TABLE 6

Serving Cells of a MAC entity may be configured by RRC in two DRX groups with separate DRX parameters. When RRC does not configure a secondary DRX group, there is only one DRX group and all Serving Cells belong to that one DRX group. When two DRX groups are configured, each Serving Cell is uniquely assigned to either of the two groups. The DRX parameters that are separately configured for each DRX group are: drx-onDurationTimer, drx-InactivityTimer. The DRX parameters that are common to the DRX groups are: drx-SlotOffset, drx-RetransmissionTimerDL, drx-RetransmissionTimerUL, drx-LongCycleStartOffset, drx-ShortCycle (optional), drx-ShortCycleTimer (optional), drx-HARQ-RTT-TimerDL, and drx-HARQ-RTT-TimerUL.
When a DRX cycle is configured, the Active Time for Serving Cells in a DRX group includes the time while:
    drx-onDurationTimer or drx-InactivityTimer configured for the DRX group is running; or
    drx-RetransmissionTimerDL or drx-RetransmissionTimerUL is running on any Serving Cell in the
    DRX group; or
    ra-ContentionResolutionTimer (as described in clause 5.1.5) or msgB-ResponseWindow (as described
    in clause 5.1.4a) is running; or
    a Scheduling Request is sent on PUCCH and is pending (as described in clause 5.4.4); or
    a PDCCH indicating a new transmission addressed to the C-RNTI of the MAC entity has not been
    received after successful reception of a Random Access Response for the Random Access Preamble
    not selected by the MAC entity among the contention-based Random Access Preamble (as described
    in clauses 5.1.4 and 5.1.4a).
When DRX is configured, the MAC entity shall:
    1> if a MAC PDU is received in a configured downlink assignment:
        2> start the drx-HARQ-RTT-TimerDL for the corresponding HARQ process in the first symbol after
            the end of the corresponding transmission carrying the DL HARQ feedback;
        2> stop the drx-RetransmissionTimerDL for the corresponding HARQ process.
    1> if a MAC PDU is transmitted in a configured uplink grant and LBT failure indication is not received
        from lower layers:
        2> start the drx-HARQ-RTT-TimerUL for the corresponding HARQ process in the first symbol after
            the end of the first repetition of the corresponding PUSCH transmission;
        2> stop the drx-RetransmissionTimerUL for the corresponding HARQ process.
    1> if a drx-HARQ-RTT-TimerDL expires:
        2> if the data of the corresponding HARQ process was not successfully decoded:
            3> start the drx-RetransmissionTimerDL for the corresponding HARQ process in the first symbol
                after the expiry of drx-HARQ-RTT-TimerDL.
    1> if a drx-HARQ-RTT-TimerUL expires:
        2> start the drx-RetransmissionTimerUL for the corresponding HARQ process in the first symbol
            after the expiry of drx-HARQ-RTT-TimerUL.
    1> if a DRX Command MAC CE or a Long DRX Command MAC CE is received:
        2> stop drx-onDurationTimer for each DRX group;
        2> stop drx-InactivityTimer for each DRX group.
    1> if drx-InactivityTimer for a DRX group expires:
        2> if the Short DRX cycle is configured:
            3> start or restart drx-ShortCycleTimer for this DRX group in the first symbol after the expiry of
                drx-InactivityTimer;
            3> use the Short DRX cycle for this DRX group.
        2> else:
            3> use the Long DRX cycle for this DRX group.
    1> if a DRX Command MAC CE is received:
        2> if the Short DRX cycle is configured:
            3> start or restart drx-ShortCycleTimer for each DRX group in the first symbol after the end of
                DRX Command MAC CE reception;
            3> use the Short DRX cycle for each DRX group.
        2> else:
            3> use the Long DRX cycle for each DRX group.
    1> if drx-ShortCycleTimer for a DRX group expires:
        2> use the Long DRX cycle for this DRX group.
    1> if a Long DRX Command MAC CE is received:
        2> stop drx-ShortCycleTimer for each DRX group;
        2> use the Long DRX cycle for each DRX group.
    1> if the Short DRX cycle is used for a DRX group, and [(SFN × 10) + subframe number] modulo (drx-ShortCycle) = (drx-StartOffset) modulo (drx-ShortCycle):
        2> start drx-onDurationTimer for this DRX group after drx-SlotOffset from the beginning of the
            subframe.

TABLE 7

1> if the Long DRX cycle is used for a DRX group, and [(SFN × 10) + subframe number] module (drx-LongCycle) = drx-StartOffset:
    2> if DCP monitoring is configured for the active DL BWP as specified in TS 38.213 [6], clause 10.3:
        3> if DCP indication associated with the current DRX cycle received from lower layer indicated to start drx-onDurationTimer, as specified in TS 38.213 [6]; or
        3> if all DCP occasions(s) in time domain, as specified in TS 38.213 [6], associated with the current DRX cycle occurred in Active Time considering grants/assignments/DRX Command MAC CE/Long DRX Command MAC CE received and Scheduling Request sent until 4 ms prior to start of the last DCP occasion, or within BWP switching interruption length, or during a measurement gap, or when the MAC entity monitors for a PDCCH transmission on the search space indicated by recoverySearchSpaceId of the SpCell indentified by the C-RNTI while the ra-ResponseWindow is running (as specified in clause 5.1.4); or TABLE 7-continued

```
            3>  if ps-Wakeup is configured with value true and DCP indication associated with the current DRX cycle has not been
                received from lower layers:
                4>  start drx-onDurationTimer after drx-SlotOffset from the beginning of the subframe.
        2>  else:
            3>  start drx-onDurationTimer for this DRX group after drx-SlotOffset from the beginning of the subframe.
NOTE 2:     In case of unaligned SFN across carriers in a cell group, the SFN of the SPCell is used to calculate the DRX duration.
1>  if a DRX group is in Active Time:
    2>  monitor the PDCCH on the Serving Cells in this DRX group as specified in TS 38.213 [6];
    2>  if the PDCCH indicates a DL transmission:
        3>  start the drx-HARQ-RTT-TimerDL for the corresponding HARQ process in the first symbol after the end of the
            corresponding transmission carrying the DL HARQ feedback;
NOTE 3:     When HARQ feedback is postponed by PDSCH-to-HARQ feedback timing indicating a non-numerical k1 value, as
            specified in TS 38.213 [6], the corresponding transmission opportunity to send the DL HARQ feedback is indicated in
            a later PDCCH requesting the HARQ-ACK feedback.
        3>  stop the drx-ReTransmissionTimerDL for the corresponding HARQ process.
        3>  if the PDSCH-to-HARQ feedback timing indicate a non-numerical k1 value as specified in TS 38.213 [6]:
            4>  start the drx-RetransmissionTimerDL in the first symbol after the PDSCH transmission for the corresponding
                HARQ process.
    2>  if the PDCCH indicates a UL transmission:
        3>  start the drx-HARQ-RTT-TimerUL for the corresponding HARQ process in the first symbol after the end of the first
            repetition of the corresponding PUSCH transmission:
        3>  stop the drx-RetransmissionTimeUL for the corresponding HARQ process.
    2>  if the PDCCH indicates a new transmission (DL or UL) on a Serving Cell in this DRX group:
        3>  start or restart drx-InactivityTimer for this DRX group in the first symbol after the end of the PDCCH reception.
    2>  if a HARQ process receives downlink feedback information and acknowledgement is indicated:
        3>  stop the drx-ReTransmissionTimerUL for the corresponding HARQ process.
1>  if DCP monitoring is configured for the active DL BWP as specified is TS 38.213 [6], clause 10.3; and
1>  if the current symbol n occurs within drx-onDurationTimer duration; and
1>  if drx-onDurationTimer associated with the current DRX cycle is not started as specified in this clause:
    2>  if the MAC entity would not be in Active Time considering grants/assignments/DRX Command MAC CE/Long DRX
        Command MAC CE received and Scheduling Request sent until 4 ms prior to symbol n when evaluating all DRX Active
        Time conditions as specified in this clause:
        3>  not transmit periodice SRS and semi-persistent SRS defined in TS 38.214 [7];
        3>  not report semi-persistent CSI configured on PUSCH;
        3>  if ps-TransmitPeriodicL1-RSRP is not configured with value true:
            4>  not report periodic CSI that is L1-RSRP on PUCCH.
        3>  if ps-TransmitOtherPeriodiceCSI is not configured with value true:
            4>  not report periodic CSI that is not L1-RSRP on PUCCH.
```

TABLE 8

```
1>  else:
    2>  in current symbol n, if a DRX group would not be in Active Time considering grants/assignments scheduled on Serving
        Cell(s) in this DRX group and DRX Command MAC CE/Long DRX Command MAC CE received and Scheduling
        Request sent until 4 ms prior to symbol n when evaluating all DRX Active Time conditions as specified in this clause;
        3>  not transmit periodic SRS and semi-persistent SRS defined in TS 38.214 [7] in this DRX group;
        3>  not report CSI on PUCCH and semi-peristent CSI configured on PUSCH in this DRX group.
    2>  if CSI masking (csi-Mask) is setup by upper layers:
        3>  in current symbol n, if drx-onDurationTimer if a DRX group would not be running considering grants/assignments
            scheduled on Serving Cell(s) in this DRX group and DRX Command MAC CE/Long DRX Command MAC CE
            received until 4 ms prior to symbol n when evaluating all DRX Active Time conditions as specified in this clause; and
            4>  not report CSI on PUCCH in this DRX group.
    NOTE 4:  If a UE multiplexes a CSI configured on PUCCH with other overlapping UCI(s) according to the procedure specified
             in TS 38.213 [6] clause 9.2.5 and this CSI multiplexed with other UCI(s) would be reported on a PUCCH resource
             outside DRX Active Time of the DRX group in which this PUCCH is configured, it is up to UE implementation
             whether to report this CSI multiplexed with other UCI(s).
Regardless of whether the MAC entitiy is monitoring PDCCH or not on the Serving Cells in a DRX group, the MAC entitiy transmits
HARQ feedback, aperiodic CSI on PUSCH, and aperiodic SRS defined in TS 38.214 [7] on the Serving Cells in the DRX group when
such is expected.
The MAC entity needs not to monitor the PDCCH if it is not a complete PDCCH occasion (e.g. the Active Time starts or ends in the
middle of a PDCCH occasion).
```

Figure 8:
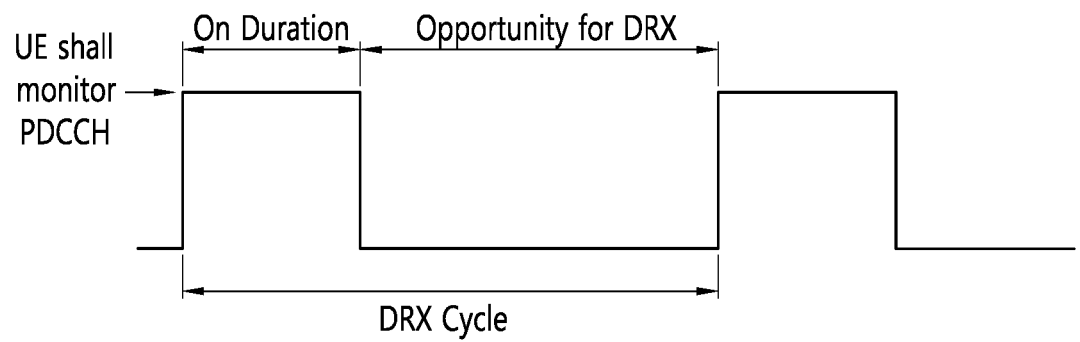
FIG. 8 shows an example of a DRX cycle according to an embodiment of the present disclosure.

FIG. 8 shows an example of a DRX cycle according to an embodiment of the present disclosure. The embodiment of FIG. 8 may be combined with various embodiments of the present disclosure.

Referring to FIG. 8, a UE uses DRX in RRC_IDLE state and RRC_INACTIVE state to reduce power consumption. When DRX is configured, the UE performs DRX operation according to DRX configuration information. The UE operating a DRX operation repeatedly turns on and off the reception task.

For example, if DRX is configured, a UE attempts to receive a downlink channel, a PDCCH, only within a pre-configured time interval, and does not attempt to receive the PDCCH within the remaining time interval. The time period during which a UE should attempt to receive a PDCCH is called on-duration, and the on-duration period is defined once per DRX cycle.

Meanwhile, in NR V2X of Release 16, a power saving operation of a user equipment (UE) was not supported, and from Release 17 NR V2X, a power saving operation of a UE (e.g., a pedestrian UE) is scheduled to be supported.

For example, an SL discontinuous reception (DRX) pattern (for example, SL DRX cycle, SL DRX on-duration or SL DRX operation during wake-up time, SL DRX off-duration or sleep mode period among SL DRX operations) or configuration for a power saving operation (e.g., a sidelink (SL) DRX operation) of a UE may need to be defined. When UEs perform SL DRX operation and SL communication based on an SL DRX configuration configured (to themselves), the following problem may occur. For example, when a first UE transmits SL data in the SL on-duration (interval in which the first UE receives SL data of another UE) of the first UE, when data reception from another UE overlaps in time, a problem of experiencing a half duplex problem (a problem in which transmission and reception cannot be performed at the same time) may occur.

Accordingly, in the embodiment(s) of the present disclosure, a method is proposed in which UEs performing SL DRX operation can avoid the half-duplex problem.

Figure 9:
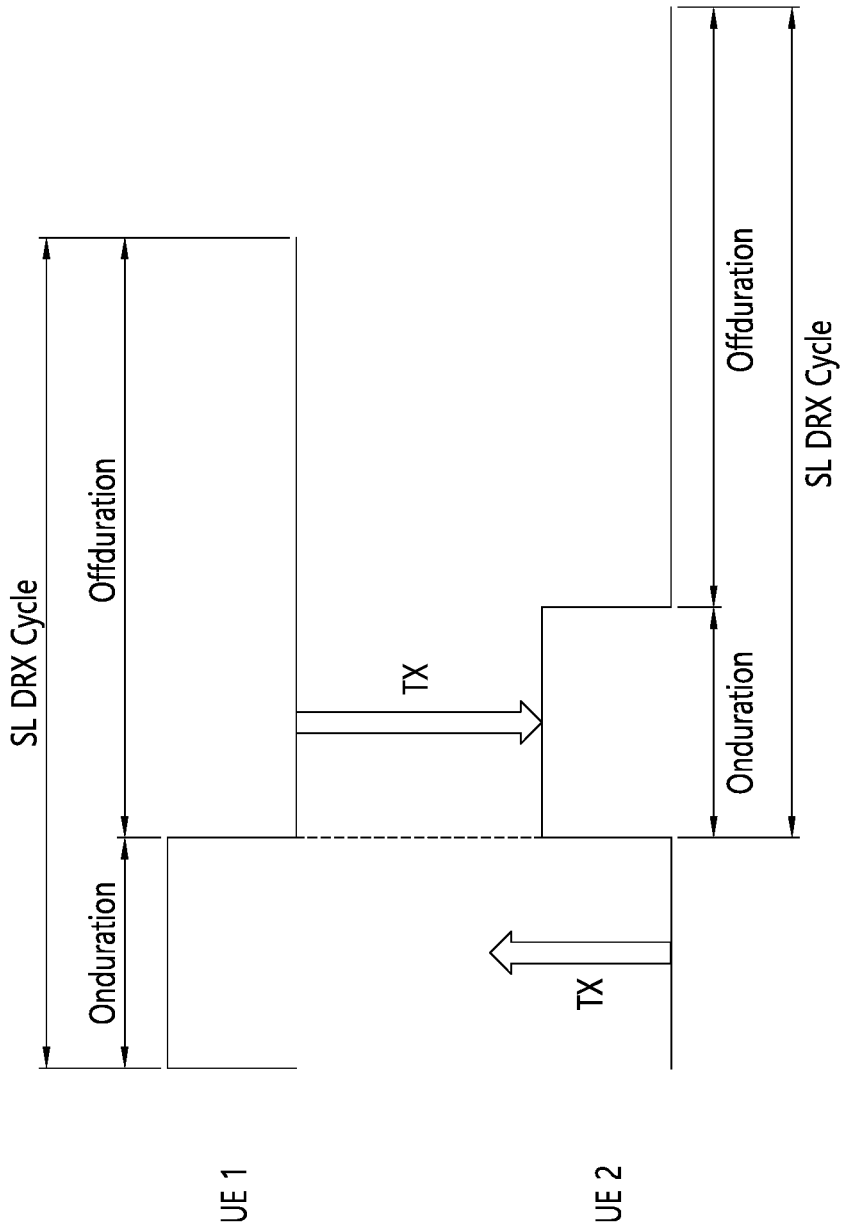
FIG. 9 shows an example in which different UEs configure SL DRX on-duration not to overlap, according to an embodiment of the present disclosure.

FIG. 9 shows an example in which different UEs configure SL DRX on-duration not to overlap, according to an embodiment of the present disclosure. The embodiment of FIG. 9 may be combined with various embodiments of the present disclosure.

Referring to FIG. 9 (Proposal 1), for example, in order to prevent a first UE and a second UE from experiencing a half-duplex problem during SL DRX operation, like shown as FIG. 9, when a base station configures the SL DRX pattern/configuration (e.g. SL DRX cycle, SL DRX on-duration) of different UEs (or when the SL DRX pattern/configuration is established through negotiation between UEs), a method of configuring the SL DRX pattern/configuration so that the SL on-durations of UEs do not overlap each other is proposed. For example, like shown as FIG. 19, by a first UE performing a transmission in its own off-duration (that is, off-duration of a counterpart second UE), and also by the second UE performing another transmission in its own off-duration (that is, the off-duration of the counterpart first UE), the half-duplex problem between the first UE and the second UE can be avoided. For example, since SL DRX on-durations between the first UE and the second UE does not overlap with each other, transmission/reception does not occur at the same time, and thus the half-duplex problem can be avoided. If, for example, SL DRX on-duration overlaps with each other, transmission/reception may occur at the same time, resulting in a half-duplex problem.

Figure 10:
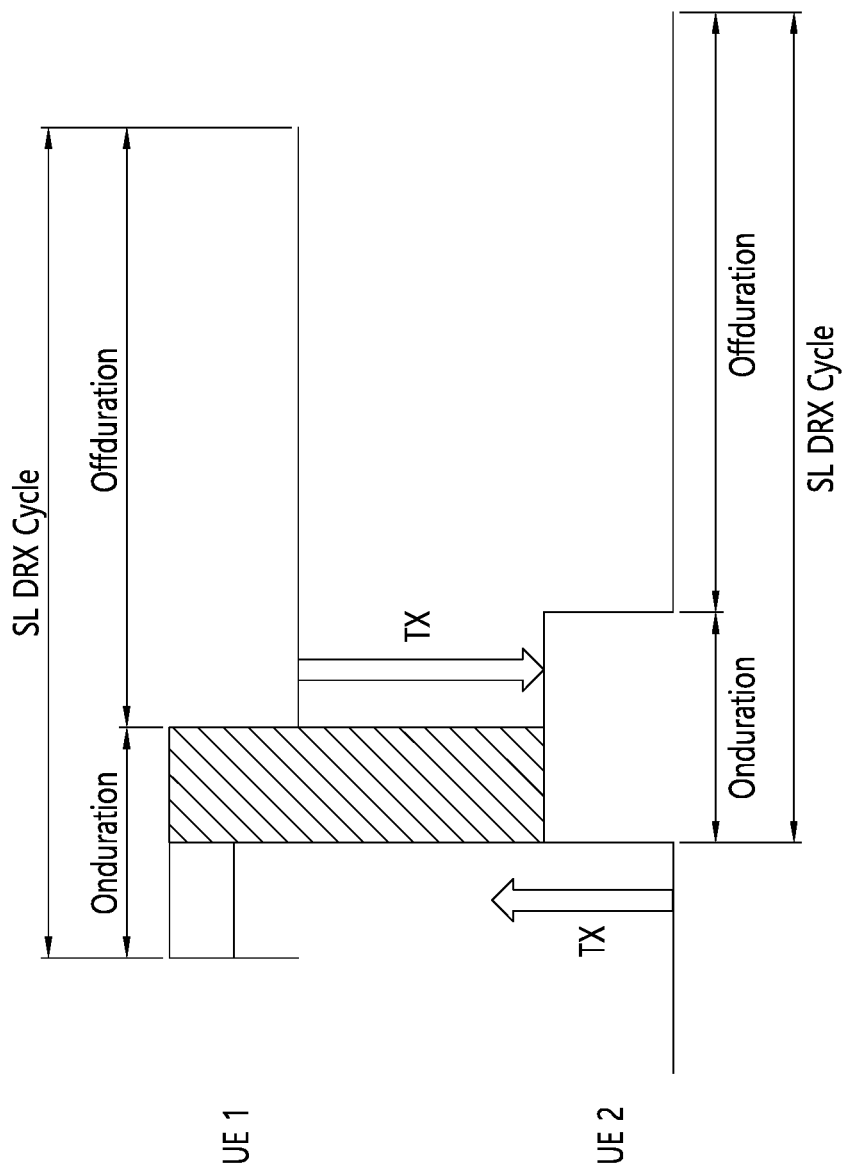
FIG. 10 shows an example in which transmission is performed in an area excluding a section in which on-durations overlap when SL DRX on-durations of different UEs overlap, according to an embodiment of the present disclosure.

FIG. 10 shows an example in which transmission is performed in an area excluding a section in which on-durations overlap when SL DRX on-durations of different UEs overlap, according to an embodiment of the present disclosure. The embodiment of FIG. 10 may be combined with various embodiments of the present disclosure.

Referring to FIG. 10 (Proposal 2), in order to prevent a first UE and a second UE from experiencing a half-duplex problem during SL DRX operation, an operation may be performed as in FIG. 10. For example, when a base station configures an SL DRX pattern/configuration of different UEs (or when an SL DRX pattern/configuration is configured through negotiation between UEs), in case of the SL DRX pattern/configuration is configured so that the SL on-duration of the UEs overlap each other, a method is proposed so that the half duplex problem can be avoided, by allowing a first UE and a second UE to perform transmission in each section except for the section where the SL DRX on-duration sections overlap with each other. That is, the half-duplex problem may be avoided by the first UE performing SL transmission in the SL DRX on-duration period of the counterpart second UE while the first UE's own SL DRX on-duration period, and by the second UE performing SL transmission in the SL DRX on-duration period of the counterpart first UE while the second UE's own SL DRX on-duration period.

Figure 11:
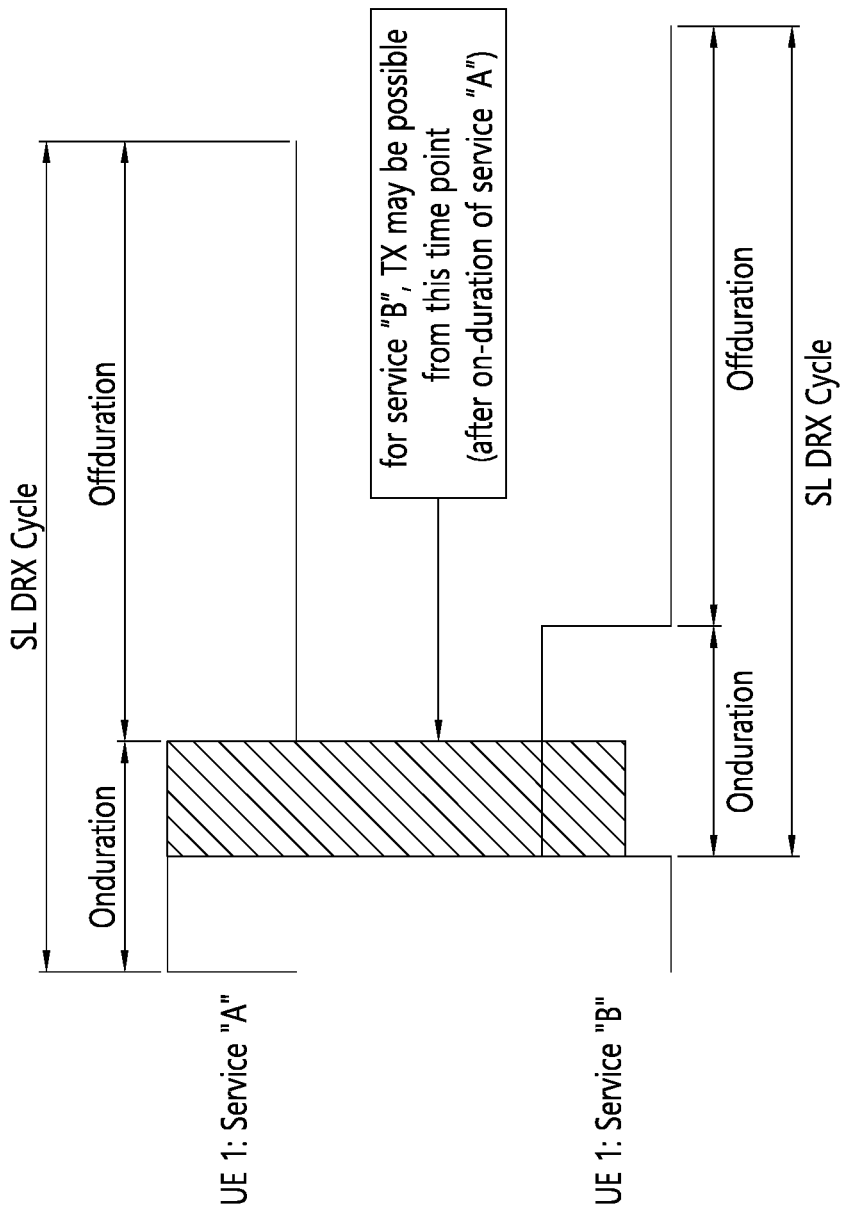
FIG. 11 shows an example in which, when SL DRX on-durations of different SL services overlap, transmission is performed in an area excluding a section where on-durations overlap, according to an embodiment of the present disclosure.

FIG. 11 shows an example in which, when SL DRX on-durations of different SL services overlap, transmission is performed in an area excluding a section where on-durations overlap, according to an embodiment of the present disclosure. The embodiment of FIG. 11 may be combined with various embodiments of the present disclosure.

Referring to FIG. 11 (Proposal 3), an embodiment in which one UE has different SL services and SL DRX patterns and configurations for different SL services are configured is shown.

For example, a first UE may operate as shown in FIG. 11 in order not to suffer a half-duplex problem during SL DRX operation. For example, when a base station configures SL DRX patterns/configurations of different SL services of a first UE (or when the SL DRX patterns/configurations are configured through negotiation between UEs), in case of SL DRX patterns/configurations is configured so that SL on-durations of different services overlap each other, a method for avoiding the half-duplex problem by allowing the first UE to transmit each service in a section except for a section in which the SL DRX on-duration section overlaps between services is proposed.

According to an embodiment of the present disclosure, the following operation is also proposed. When an SL priority value of an SL service "A (an SL service received by the first UE)" of a first UE is "1" and an SL priority value of an SL service "B (an SL service transmitted by the first UE)" of the first UE is "2", to ensure successful reception of high-priority service "A" (by avoiding the half-duplex problem), a method of allowing transmission of the SL service "B" at a time point when the on-duration of the service "A" has passed (a duration in which the on-duration of the service "A" does not overlap among the on-duration of the service "B", or the off-duration of service "B") is proposed. For example, in the present disclosure, it is assumed that a service having a low priority value has a high priority. For example, in FIG. 11, the SL DRX pattern/configuration of service "B" of the first UE is an SL DRX pattern/configuration for reception of SL service "B", but transmission of the SL service "B" may also be performed. That is, for example, the first UE may perform transmission in the on-duration or the off-duration of the SL service "B".

Figure 12:
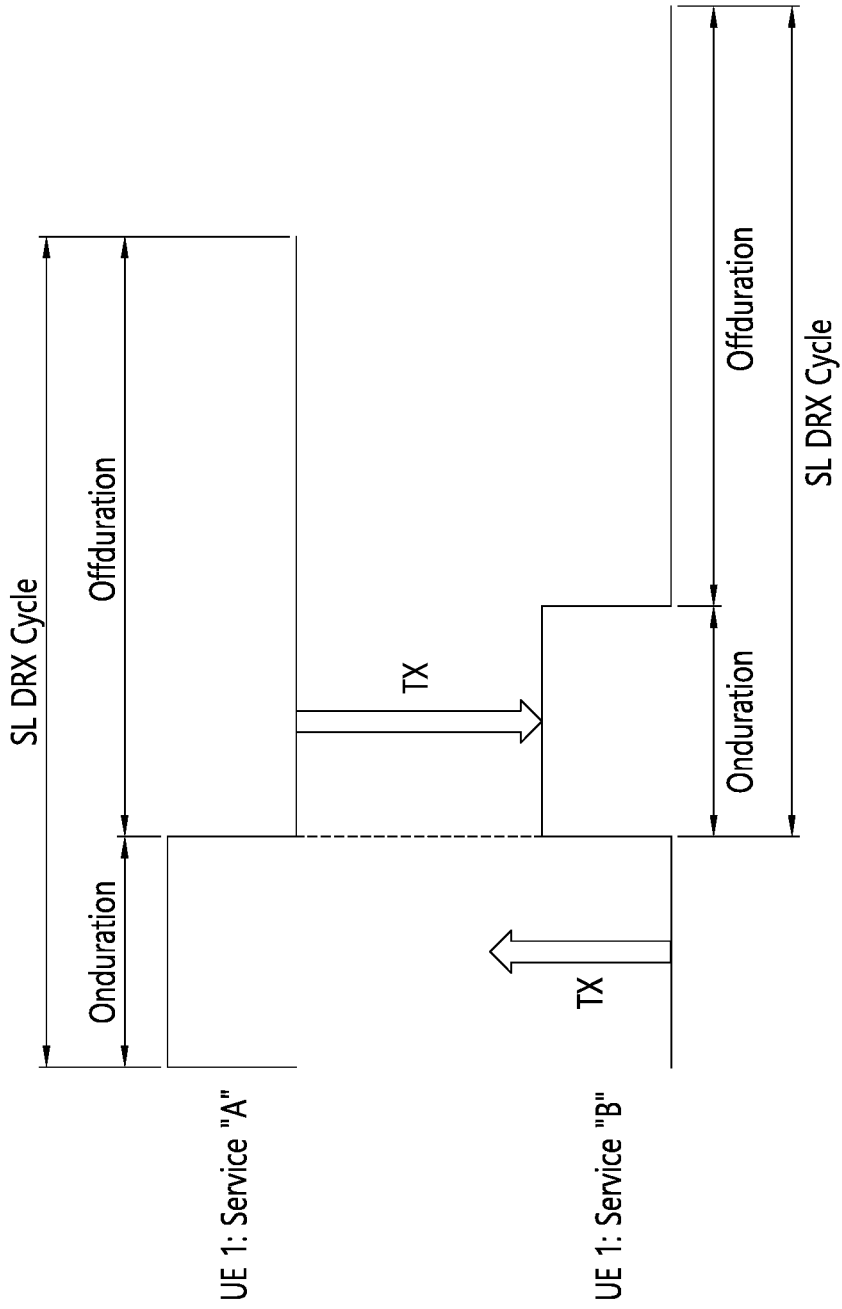
FIG. 12 shows an example of configuring so that SL DRX on-durations of different SL services do not overlap, according to an embodiment of the present disclosure.

FIG. 12 shows an example of configuring so that SL DRX on-durations of different SL services do not overlap, according to an embodiment of the present disclosure. The embodiment of FIG. 12 may be combined with various embodiments of the present disclosure.

Referring to FIG. 12 (Proposal 4), in order to prevent the first UE from experiencing the half-duplex problem during SL DRX operation, as shown is FIG. 12, in case of a base station configures SL DRX patterns/configurations of different SL services of a first UE (or when configuring the SL DRX patterns/configurations through negotiation between UEs), a method of configuring the SL DRX patterns/configurations is proposed so that the SL on-durations of the different SL services (service "A", service "B") do not overlap each other. For example, as shown in FIG. 12, by a first UE performing a transmission in an off-duration of a service "B" (that is, an on-duration of a service "A"), and also by the first UE performing a transmission in an off-duration of the service "A" (that is, an on-duration of the service "B"), the half-duplex problem between different services can be avoided. That is, for example, since the SL DRX on-duration between different SL services does not overlap, the transmission/reception does not occur at the same time, thus, the half-duplex problem can be avoided. If, for example, SL DRX on-duration is overlapped between different services, transmission/reception may occur at the same time, therefore, a half-duplex problem may occur.

A UE may perform an SL DRX operation (on-duration operation: performing an SL transmission/reception in an active mode, off-duration operation: performing a sleep mode operation by "off"ing the SL RF) based on an SL DRX pattern (DRX cycle, DRX on-duration (timer), DRX off-duration), for a power saving operation.

In the embodiment (s) of the present disclosure, a method a the transmitting UE to perform SL transmission and SL DRX operation in consideration of SL service priority (e.g., SL service priority or SL-priority) and SL congestion level is proposed.

For example, a transmitting UE may have a plurality of SL services for SL transmission. For example, when the transmitting UE has SL service "A" and SL service B, the following operation may be performed.

For example, when SL service "A" (high priority) is an SL service having a higher priority than SL service B (low priority), when an SL DRX on-duration of a receiving UE for receiving an SL packet for the SL service "A" of a transmitting UE overlaps an SL DRX on-duration of the receiving UE for receiving an SL packet for the SL service "B" of the transmitting UE, the transmitting UE may have to decide how to transmit a packet for SL service "A" and a packet for SL service "B". For example, it may have to be determined whether to transmit the packet for service "A" first or the packet for service "B" first. Or, for example, if the packet for service "A" is transmitted first, whether to transmit in a section of the receiving UE where the SL DRX on-duration for service "A" and the SL DRX on-duration for service "B" overlap, or in a non-overlapping duration, etc. may have to be determined. For example, if an SL DRX pattern (e.g. SL DRX cycle, SL DRX on-duration (timer), SL DRX related timer, etc.) of a receiving UE is interlocked for each SL service in the above operation, it may be presupposed(assumed/preceded) that the receiving UE performs a DRX operation based on the SL DRX on-duration (timer) interlocked for each SL service. For example, in the present disclosure, the following operating method is proposed.

For example, in case that SL service "A" (high priority) is an SL service with higher priority than SL service B (low priority), and that an SL DRX on-duration of a receiving UE for receiving an SL packet for the SL service "A" of a transmitting UE and an SL DRX on-duration of the receiving UE for receiving an SL packet for the SL service "B" of the transmitting UE overlap (at least in part, or in all), the transmitting UE may transmit the packet for the SL service "A" with high service priority, in the SL DRX on-duration (timer) of the receiving UE for the SL service "A", or in a section where the SL DRX on-duration of the receiving UE for SL service "A" and the SL DRX on-duration of the receiving UE for SL service "B" overlap.

Also, for example, a transmitting UE may transmit a packet for an SL service "B" having a low service priority in a section in which an SL DRX on-duration of a receiving UE for an SL service "A" and the SL service "B" does not overlap. Here, the non-overlapping section may be included in the SL DRX on-duration of the receiving UE for the SL service "B". If the packet for the SL service "B" is transmitted in a section where the SL DRX on-duration related to the SL service "A" and the SL DRX on-duration related to the SL service "B" overlap, interference may occur in SL transmission or retransmission of the SL service "A", or transmission/reception of an SL signal (e.g., SL HARQ feedback).

Alternatively, for example, if an SL DRX on-duration (timer) section is a very short time period, and if a plurality of SL services (for example, an SL service with high priority: an SL service "A" in the embodiment of the present disclosure, and an SL service with low priority: an SL service "B" in the embodiment of the present disclosure) are supported together in the SL DRX on-duration (timer), there may be a problem in that it is difficult to support all transmission resource reservations for the plurality of SL services in a limited period of the short SL DRX on-duration (timer). Therefore, for example, a transmission resource reservation period may need to be used separately for each SL service priority.

Accordingly, for example, by enabling an SL packet for a service "B" with low service priority to be transmitted in an area separated from the transmission period of an SL service "A", interference that may occur in transmission/reception of the SL service "A" having a high priority can be reduced. Alternatively, for example, a phenomenon in which transmission resources are excessively concentrated in an SL DRX on-duration (timer) may be reduced.

Also, for example, if the following conditions are satisfied, an SL packet for an SL service "B" having a low priority may also be allowed to be transmitted in a section overlapping an SL on-duration of an SL service "A" having a high priority. That is, when the SL service "A" (high priority) has higher priority than an SL service B (low priority), and an SL DRX on-duration of a receiving UE for receiving the SL packet for the SL service "A" of a transmitting UE overlaps an SL DRX on-duration of the receiving UE for receiving the SL packet for the SL service "B" of the transmitting UE, only when the following conditions are satisfied, the transmitting UE may transmit the packet for the SL service "B" with lower service priority in a section in which the SL DRX on-duration of the receiving UE for SL service "A" and the SL DRX on-duration of the receiving UE for SL service "B" overlap.

When the congestion level in a resource area of a section, in which an SL DRX on-duration of a receiving UE for receiving an SL packet for an SL service "A" (e.g., high priority) of a transmitting UE and an SL DRX on-duration of the receiving UE for receiving an SL packet for an SL service "B" (e.g., low priority) of the transmitting UE do not overlap, is greater than or equal to a threshold.

That is, if the congestion level in a resource area of a section, in which an SL DRX on-duration of a receiving UE for receiving an SL packet for an SL service "A" (e.g., high priority) of a transmitting UE and an SL DRX on-duration of the receiving UE for receiving an SL packet for an SL service "B" (e.g., low priority) of the transmitting UE do not overlap, is greater than or equal to a threshold, even a low-priority SL service (e.g., the SL service "B" in the preceding description) may be transmitted in a section overlapping the SL DRX on-duration region of the high-priority SL service.

According to an embodiment of the present disclosure, if an SL service "A" (high priority) is an SL service having a higher priority than an SL service B (low priority), and an SL DRX on-duration of a receiving UE for receiving an SL packet for the SL service "A" of a transmitting UE overlaps an SL DRX on-duration of the receiving UE for receiving an SL packet for an SL service "B" of the transmitting UE, a transmitting UE may not be able to transmit a packet for the SL service "B" with lower service priority in a section where an SL DRX on-duration of the receiving UE for the SL service "A" and an SL DRX on-duration of the receiving UE for the SL service "B" overlap, but a transmitting UE may transmit in a SL DRX on-duration of the receiving UE for the SL service "B" excluding the overlapping section, only if the following conditions are satisfied.

When congestion level in a section where an SL DRX on-duration of a receiving UE for receiving an SL packet for an SL service "A" (e.g., higher priority) of a transmitting UE and an SL DRX on-duration of the receiving UE for receiving an SL packet for an SL service "B" (e.g., higher priority) of a transmitting UE overlap is greater than or equal to a threshold.

That is, for example, only when congestion level in a section where an SL DRX on-duration of a receiving UE for receiving an SL packet for an SL service "A" (e.g., higher priority) of a transmitting UE and an SL DRX on-duration of the receiving UE for receiving an SL packet for an SL service "B" (e.g., higher priority) of a transmitting UE overlap is greater than or equal to a threshold, a transmission of an SL service with lower priority may be transmitted in an SL DRX on-duration for a service with lower priority, excluding a section where an SL DRX on-duration for a service with higher priority and an SL DRX on-duration for a service with lower priority overlap.

According to an embodiment of the present disclosure, if an SL service "A" (higher priority) is an SL service with higher priority than an SL service "B" (lower priority), and if an SL DRX on-duration of a receiving UE for receiving an SL packet for an SL service "A" of a transmitting UE overlaps an SL DRX on-duration of the receiving UE for receiving an SL packet for an SL service "B" of a transmitting UE, a transmitting UE may only transmit the an initial transmission packet, in a section where an SL DRX on-duration of the receiving UE for the SL service "A" and an SL DRX on-duration of the receiving UE for the SL service "B" overlap, when the transmitting UE transmits a packet for an SL service "B" with lower service priority, if the following conditions are satisfied. For example, in this case, an initial transmission packet for the SL service "B" with a lower priority may have priority over a retransmission packet for the SL service "A" with a high priority. Alternatively, in a section where an SL DRX on-duration of the receiving UE for the SL service "A" and an SL DRX on-duration of the receiving UE for the SL service "B" overlap, when the transmitting UE transmits a packet for an SL service "B" with lower service priority, only blind retransmission (a method of bundling and transmitting a plurality of SL packets without SL HARQ feedback without performing retransmission based on SL HARQ NACK feedback) may be performed.

When a congestion level in a resource region of a section where an SL DRX on-duration of a receiving UE for receiving an SL packet for an SL service "A" (e.g., higher priority) of a transmitting UE and an SL DRX on-duration of the receiving UE for receiving an SL packet for an SL service "B" (e.g., higher priority) of a transmitting UE overlap is greater than or equal to a threshold.

According to an embodiment of the present disclosure, when an SL service "A" (high priority) is an SL service having a higher priority than an SL service B (low priority), and an SL DRX on-duration of a receiving UE for receiving an SL packet for the SL service "A" of a transmitting UE overlaps an SL DRX on-duration of the receiving UE for receiving an SL packet for an SL service "B" of the transmitting UE, a transmitting UE may configure or adjust the maximum number of transmissions for the SL service "B" having a low priority when transmitting a packet for the SL service "B" having a low service priority, only if the following conditions are satisfied. Conversely, for example, when transmitting a packet for the SL service "A" having a high service priority, the transmitting UE may configure or adjust the maximum number of transmissions for the SL service "A" having a high priority to be high.

When a congestion level in a resource region of a section where an SL DRX on-duration of a receiving UE for receiving an SL packet for an SL service "A" (e.g., higher priority) of a transmitting UE and an SL DRX on-duration of the receiving UE for receiving an SL packet for an SL service "B" (e.g., higher priority) of a transmitting UE overlap is greater than or equal to a threshold.

The SL DRX on-duration mentioned in this disclosure may refer to a period in which a receiving UE wakes up to receive or monitor an SL packet transmitted by a transmitting UE. In addition, a transmitting UE may perform SL transmission in the SL DRX on-duration period of a receiving UE. For example, this may be because the receiving UE can receive the SL packet transmitted by the transmitting UE only when it is transmitted in the on-duration of the receiving UE.

Also, for example, an SL priority mentioned in this disclosure may be interpreted as follows.

1. Priority linked with SL service, SL priority transferred from an upper layer (V2X layer) to an AS layer
2. SL priority which is indicated (via SCI) from a MAC layer to a physical layer.
3. SL priority mapped to a logical channel or logical channel group related to an SL service An SL DRX configuration mentioned in this disclosure may include parameters as shown in Table 9 below.

TABLE 9

Sidelink DRX configurations

✓ SL drx-onDurationTimer: the duration at the beginning of a DRX Cycle;
✓ SL drx-SlotOffset: the delay before starting the drx-onDurationTimer;
✓ SL drx-InactivityTimer: the duration after the PSCCH occasion in which a PSCCH indicates a new SL transmission for the MAC entity;
✓ SL drx-RetransmissionTimer (per HARQ process): the maximum duration until a retransmission is received;
✓ SL drx-HARQ-RTT-Timer (per HARQ process): the minimum duration before PSCCH (Sidelink Control Information) & PSSCH for SL HARQ retransmission is expected by the MAC entity;
✓ SL drx-LongCycleStartOffset: the Long DRX cycle and drx-StartOffset which defines the subframe where the Long and Short DRX Cycle starts;
✓ SL drx-ShortCycle (optional): the Short DRX cycle;
✓ SL drx-ShortCycleTimer (optional): the duration the UE shall follow the Short DRX cycle; SL-drx HARQ-RTT-Timer (per HARQ process): the minimum duration before an assignment for HARQ retransmission is expected by the MAC entity.

In the following description, names of timers (Uu DRX inactivity timer SL, Uu DRX RTT timer SL, Uu DRX retransmission SL, SL DRX on-duration (timer), SL DRX inactivity timer, SL DRX HARQ RTT timer, SL DRX retransmission timer, etc.) are exemplary, and timers that perform the same/similar functions based on the contents described in each timer may be regarded as the same/similar timers regardless of their names.

The proposal of the present disclosure may be extended and applied not only to a default/common SL DRX configuration or parameters (and timers) included in the default/common SL DRX pattern or default/common SL DRX configuration, but also to a UE-pair-specific SL DRX configuration or parameters (and timers) included in UE-pair specific SL DRX pattern or UE-pair specific SL DRX configurations, etc. In addition, the on-duration term mentioned in the proposal of the present disclosure may be extended and interpreted as an active time (interval operating in a wake-up state (RF module is "On") to receive/transmit a wireless signal) period, the off-duration term may be extended to be interpreted as a sleep time period (for power saving, a section operating in a sleep mode state (that is, a state in which the RF module is "Off"), a transmitting UE does not mean that it is obligatory to operate in a sleep mode during the sleep time section. For example, in this case, even during sleep time, it may be permitted to operate as an active time for a short time for sensing/transmission operation.), in addition, "whether or not the (some) proposed method/rule of the present disclosure are applied and/or related parameters (e.g., threshold values) may be configured specifically (or differently or independently) according to a resource pool, congestion level, service priority (and/or type), requirements (e.g., latency, reliability), traffic type (e.g., (non-) periodic generation), SL transmission resource allocation mode (mode 1, mode 2), etc.". For example, a sleep time period may be, for power saving, a section operating in a sleep mode state (that is, a state in which the RF module is "Off"), a transmitting UE does not mean that it is obligatory to operate in a sleep mode during the sleep time section. For example, if needed, even during sleep time, it may be permitted to operate as an active time for a short time for sensing/transmission operation.

For example, whether the proposed rule of the present disclosure is applied (and/or related parameter configuration value) may be specifically (and/or independently and/or differently) configured for at least one of a resource pool, service/packet type (and/or priority), QoS requirement (e.g., URLLC/EMBB traffic, reliability, delay), cast type (e.g., unicast, groupcast, broadcast), (resource pool) congestion level (e.g., CBR), SL HARQ feedback scheme (e.g., NACK only feedback, ACK/NACK feedback), a case of transmitting a HARQ feedback enabled MAC PDU (and/or HARQ feedback disabled MAC PDU), whether to configure PUCCH based SL HARQ feedback report operation, a case of pre-emption (and/or re-evaluation) performing (or, pre-emption based resource reselection), (L2 or L1) (source and/or destination) identifier, PC5 RRC connection/link, a case of performing SL DRX, SL mode type (resource allocation mode 1, resource allocation mode 2), a case of performing (non)periodic resource reservation.

The term "constant time" referred to in the proposal of the present disclosure may refer to a time during which a UE operates as an active time for a predefined time to receive an SL signal or an SL data from other UE, or a time in which the UE operates as an active time as long as a time or a specific timer (SL DRX retransmission timer or SL DRX inactivity timer or timer that guarantees to operate as active time in DRX operation of a receiving UE).

Whether the proposal or the proposal rule of the present disclosure is applied (and/or related parameter configuration values) may also be applied to the mmWave SL operation.

Various embodiments of the present disclosure may be combined with each other.

According to an embodiment proposed in the present disclosure, when a UE performing an SL DRX operation performs a plurality of services including a service related to SL transmission and a service related to SL reception, a problem in which wireless communication cannot be smoothly performed due to a half-duplex problem that may occur when on-durations of SL transmission/reception overlap among the plurality of services may be solved.

Figure 13:
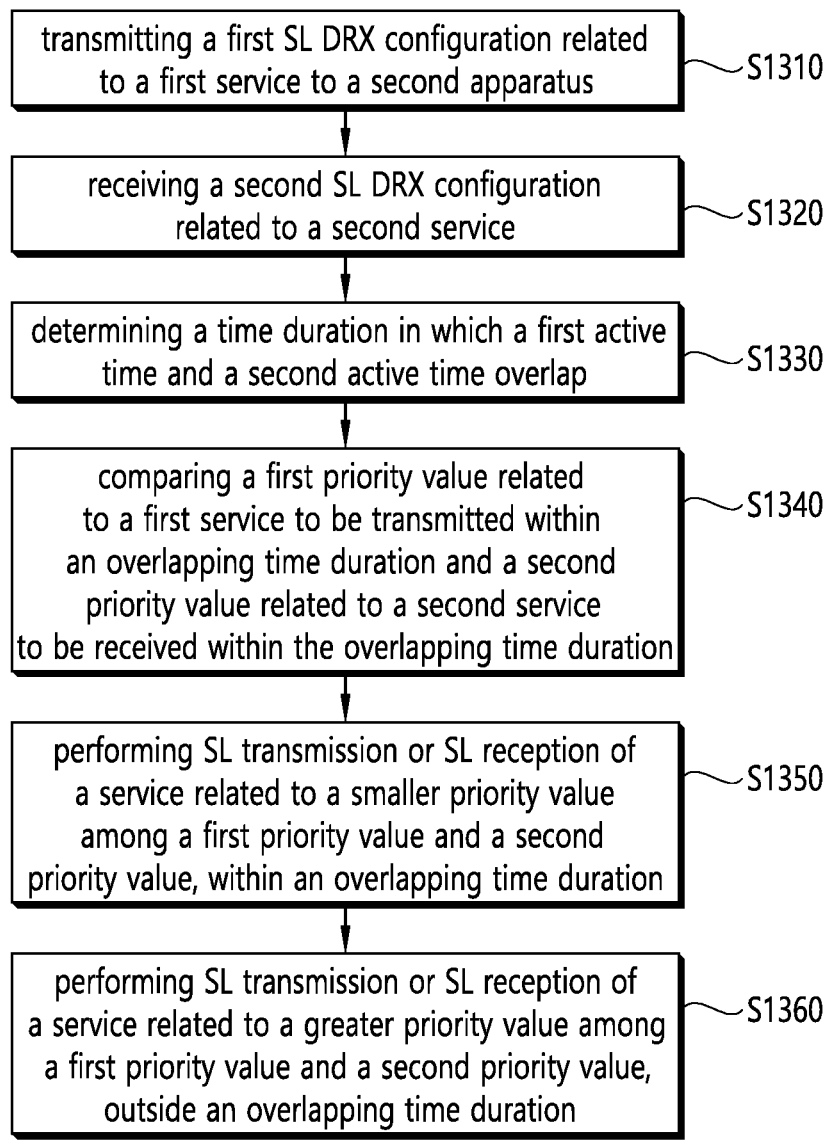
FIG. 13 shows a procedure for a first apparatus to perform wireless communication, according to an embodiment of the present disclosure.

FIG. 13 shows a procedure for a first apparatus to perform wireless communication, according to an embodiment of the present disclosure. The embodiment of FIG. 13 may be combined with various embodiments of the present disclosure.

Referring to FIG. 13, in step S1310, a first apparatus may transmit a first sidelink (SL) discontinuous reception (DRX) configuration related to a first service to a second apparatus. For example, the first SL DRX configuration may include information related to a timer for a first active time and information related to a first DRX cycle. In step S1320, the first apparatus may receive a second SL DRX configuration related to a second service. For example, the second SL DRX configuration may include information related to a timer for a second active time and information related to a second DRX cycle. In step S1330, the first apparatus may determine a time duration in which the first active time and the second active time overlap. In S1340, the first apparatus may compare a first priority value related to the first service to be transmitted within the overlapping time duration and a second priority value related to the second service to be received within the overlapping time duration. In step S1350, the first apparatus may perform SL transmission or SL reception of a service related to a smaller priority value among the first priority value and the second priority value, within the overlapping time duration. In step S1360, the first apparatus may perform SL transmission or SL reception of a service related to a greater priority value among the first priority value and the second priority value, outside the overlapping time duration.

For example, the SL transmission or the SL reception of the service related to the greater priority value among the first priority value and the second priority value may be performed in a sleep duration of a SL DRX configuration related to the greater priority value among the first priority value and the second priority value.

For example, the SL transmission or the SL reception of the service related to the greater priority value among the first priority value and the second priority value may be performed outside the overlapping time duration of the second active time.

For example, the step of transmitting the first SL DRX configuration related to the first service to the second apparatus may include: configuring the first SL DRX configuration so that the first active time and the second active time do not overlap.

For example, the step of transmitting the first SL DRX configuration related to the first service to the second apparatus may further include: receiving, from the second apparatus, information for configuring the first active time and the second active time not to overlap.

For example, the timer for the first active time may include at least one of a first SL DRX on-duration timer, a first SL DRX inactivity timer, or a first SL DRX retransmission timer.

For example, the first active time may be a time during which at least one of the first SL DRX on-duration timer, the first SL DRX inactivity timer, or the first SL DRX retransmission timer is running.

For example, the timer for the second active time may include at least one of a second SL DRX on-duration timer, a second SL DRX inactivity timer, or a second SL DRX retransmission timer.

For example, the second active time may be a time during which at least one of the second SL DRX on-duration timer, the second SL DRX inactivity timer, or the second SL DRX retransmission timer is running.

For example, the first SL DRX configuration may be a default SL DRX configuration or a common SL DRX configuration.

For example, the second SL DRX configuration may be a default SL DRX configuration or a common SL DRX configuration.

For example, the first SL DRX configuration may be an SL DRX configuration related to a pair of the first apparatus and the second apparatus.

For example, the second SL DRX configuration may be an SL DRX configuration related to a pair of the first apparatus and the second apparatus.

The above-described embodiment may be applied to various apparatuses to be described below. For example, a processor 102 of a first apparatus 100 performing wireless communication may control a transceiver 106 to transmit a first sidelink (SL) discontinuous reception (DRX) configuration related to a first service to a second apparatus. For example, the first SL DRX configuration may include information related to a timer for a first active time and information related to a first DRX cycle. And, the processor 102 of the first apparatus 100 may control the transceiver 106 to receive a second SL DRX configuration related to a second service. For example, the second SL DRX configuration may include information related to a timer for a second active time and information related to a second DRX cycle. And, the processor 102 of the first apparatus 100 may determine a time duration in which the first active time and the second active time overlap. And, the processor 102 of the first apparatus 100 may compare a first priority value related to the first service to be transmitted within the overlapping time duration and a second priority value related to the second service to be received within the overlapping time duration. And, the processor 102 of the first apparatus 100 may control the transceiver to perform SL transmission or SL reception of a service related to a smaller priority value among the first priority value and the second priority value, within the overlapping time duration. And, the processor 102 of the first apparatus 100 may control the transceiver to perform SL transmission or SL reception of a service related to a greater priority value among the first priority value and the second priority value, outside the overlapping time duration.

According to an embodiment of the present disclosure, a first apparatus for performing wireless communication may be proposed. For example, the first apparatus may comprise: one or more memories storing instructions; one or more transceivers; and one or more processors connected to the one or more memories and the one or more transceivers. For example, the one or more processors may execute the instructions to: transmit a first sidelink (SL) discontinuous reception (DRX) configuration related to a first service to a second apparatus, wherein the first SL DRX configuration includes information related to a timer for a first active time and information related to a first DRX cycle; receive a second SL DRX configuration related to a second service, wherein the second SL DRX configuration includes information related to a timer for a second active time and information related to a second DRX cycle; determine a time duration in which the first active time and the second active time overlap; compare a first priority value related to the first service to be transmitted within the overlapping time duration and a second priority value related to the second service to be received within the overlapping time duration; perform SL transmission or SL reception of a service related to a smaller priority value among the first priority value and the second priority value, within the overlapping time duration; and perform SL transmission or SL reception of a service related to a greater priority value among the first priority value and the second priority value, outside the overlapping time duration.

According to an embodiment of the present disclosure, an apparatus configured to control a first user equipment (UE) may be proposed. For example, the apparatus may comprise: one or more processors; and one or more memories operably connectable to the one or more processors and storing instructions. For example, the one or more processors may execute the instructions to: transmit a first sidelink (SL) discontinuous reception (DRX) configuration related to a first service to a second UE, wherein the first SL DRX configuration includes information related to a timer for a first active time and information related to a first DRX cycle; receive a second SL DRX configuration related to a second service, wherein the second SL DRX configuration includes information related to a timer for a second active time and information related to a second DRX cycle; determine a time duration in which the first active time and the second active time overlap; compare a first priority value related to the first service to be transmitted within the overlapping time duration and a second priority value related to the second service to be received within the overlapping time duration; perform SL transmission or SL reception of a service related to a smaller priority value among the first priority value and the second priority value, within the overlapping time duration; and perform SL transmission or SL reception of a service related to a greater priority value among the first priority value and the second priority value, outside the overlapping time duration.

According to an embodiment of the present disclosure, a non-transitory computer-readable storage medium storing instructions may be proposed. For example, the instructions, when executed, may cause a first apparatus to: transmit a first sidelink (SL) discontinuous reception (DRX) configuration related to a first service to a second apparatus, wherein the first SL DRX configuration includes information related to a timer for a first active time and information related to a first DRX cycle; receive a second SL DRX configuration related to a second service, wherein the second SL DRX configuration includes information related to a timer for a second active time and information related to a second DRX cycle; determine a time duration in which the first active time and the second active time overlap; compare a first priority value related to the first service to be transmitted within the overlapping time duration and a second priority value related to the second service to be received within the overlapping time duration; perform SL transmission or SL reception of a service related to a smaller priority value among the first priority value and the second priority value, within the overlapping time duration; and perform SL transmission or SL reception of a service related to a greater priority value among the first priority value and the second priority value, outside the overlapping time duration.

Figure 14:
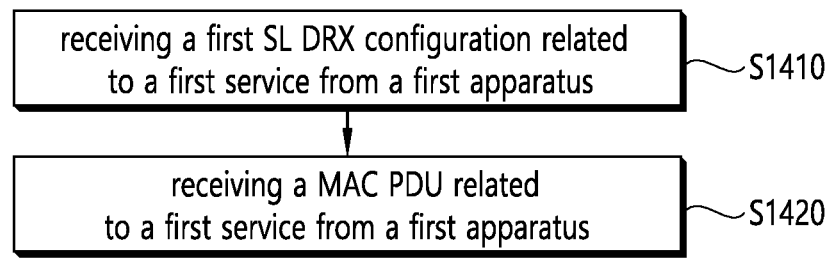
FIG. 14 shows a procedure for a second apparatus to perform wireless communication, according to an embodiment of the present disclosure.

FIG. 14 shows a procedure for a second apparatus to perform wireless communication, according to an embodiment of the present disclosure. The embodiment of FIG. 14 may be combined with various embodiments of the present disclosure.

Referring to FIG. 14, in step S1410, a second apparatus may receive a first sidelink (SL) discontinuous reception (DRX) configuration related to a first service from a first apparatus. For example, the first SL DRX configuration may include information related to a timer for a first active time and information related to a first SL DRX cycle. In step S1420, the second apparatus may receive a medium access control (MAC) protocol data unit (PDU) related to the first service from the first apparatus. For example, based on that a first priority value related to the first service to be transmitted from the first apparatus in a time duration where the first active time and a second active time overlap is smaller than a second priority value related to a second service to be received to the second apparatus in the overlapped time duration, the MAC PDU may be received in the overlapped time duration, and wherein based on that the first priority value is greater than the second priority value in the overlapped time duration, the MAC PDU may be received outside the overlapped time duration.

For example, additionally, the second apparatus may transmit information for configuring the first active time and the second active time not to overlap to the first apparatus. For example, the first SL DRX configuration may be configured by the first apparatus, based on the transmitted information, so that the first active time and the second active time don't overlap.

The above-described embodiment may be applied to various apparatuses to be described below. For example, a processor 202 of a second apparatus 200 may control a transceiver 206 to receive a first sidelink (SL) discontinuous reception (DRX) configuration related to a first service from a first apparatus. For example, the first SL DRX configuration may include information related to a timer for a first active time and information related to a first SL DRX cycle. And, the processor 202 of the second apparatus 200 may control the transceiver 206 to receive a medium access control (MAC) protocol data unit (PDU) related to the first service from the first apparatus. For example, based on that a first priority value related to the first service to be transmitted from the first apparatus in a time duration where the first active time and a second active time overlap is smaller than a second priority value related to a second service to be received to the second apparatus in the overlapped time duration, the MAC PDU may be received in the overlapped time duration, and, based on that the first priority value is greater than the second priority value in the overlapped time duration, the MAC PDU may be received outside the overlapped time duration.

According to an embodiment of the present disclosure, a second apparatus for performing wireless communication may be proposed. For example, the second apparatus may comprise: one or more memories storing instructions; one or more transceivers; and one or more processors connected to the one or more memories and the one or more transceivers. For example, the one or more processors may execute the instructions to: receive a first sidelink (SL) discontinuous reception (DRX) configuration related to a first service from a first apparatus, wherein the first SL DRX configuration includes information related to a timer for a first active time and information related to a first SL DRX cycle; and receive a medium access control (MAC) protocol data unit (PDU) related to the first service from the first apparatus, wherein based on that a first priority value related to the first service to be transmitted from the first apparatus in a time duration where the first active time and a second active time overlap is smaller than a second priority value related to a second service to be received to the second apparatus in the overlapped time duration, the MAC PDU is received in the overlapped time duration, and wherein based on that the first priority value is greater than the second priority value in the overlapped time duration, the MAC PDU is received outside the overlapped time duration.

For example, the one or more processors may further execute the instructions to: transmit information for configuring the first active time and the second active time not to overlap to the first apparatus, wherein the first SL DRX configuration is configured by the first apparatus, based on the transmitted information, so that the first active time and the second active time don't overlap.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 15:
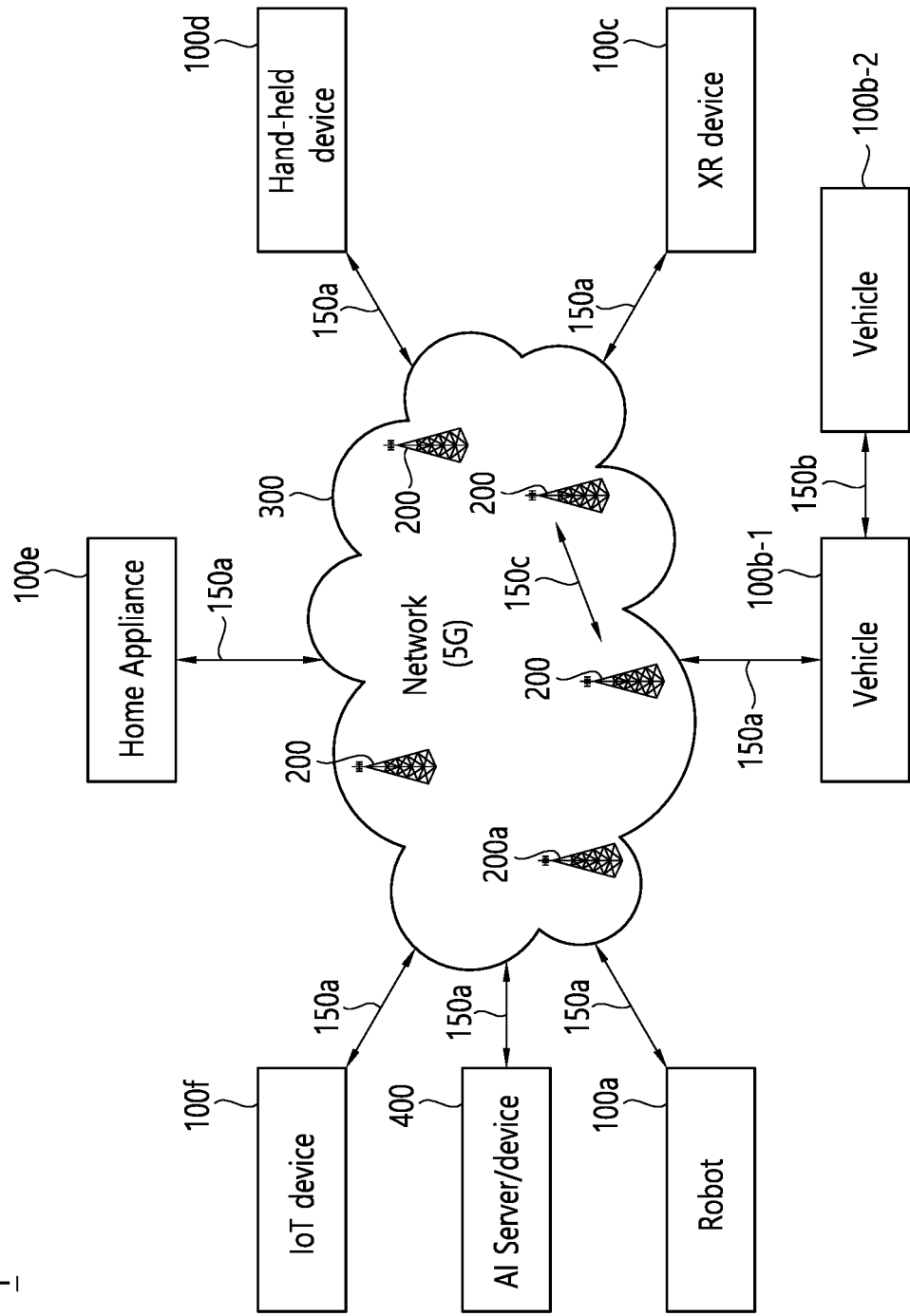
FIG. 15 shows a communication system 1, based on an embodiment of the present disclosure.

FIG. 15 shows a communication system 1, based on an embodiment of the present disclosure. The embodiment of FIG. 15 may be combined with various embodiments of the present disclosure.

Referring to FIG. 15, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 16:
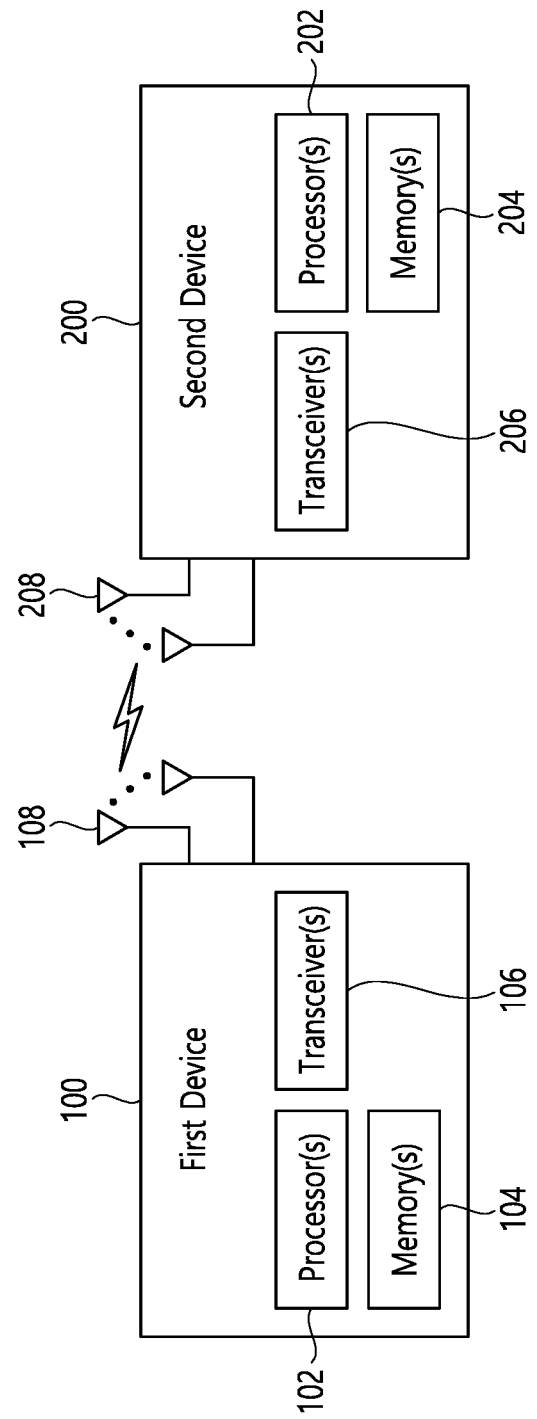
FIG. 16 shows wireless devices, based on an embodiment of the present disclosure.

FIG. 16 shows wireless devices, based on an embodiment of the present disclosure. The embodiment of FIG. 16 may be combined with various embodiments of the present disclosure.

Referring to FIG. 16, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 15.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor (s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 17:
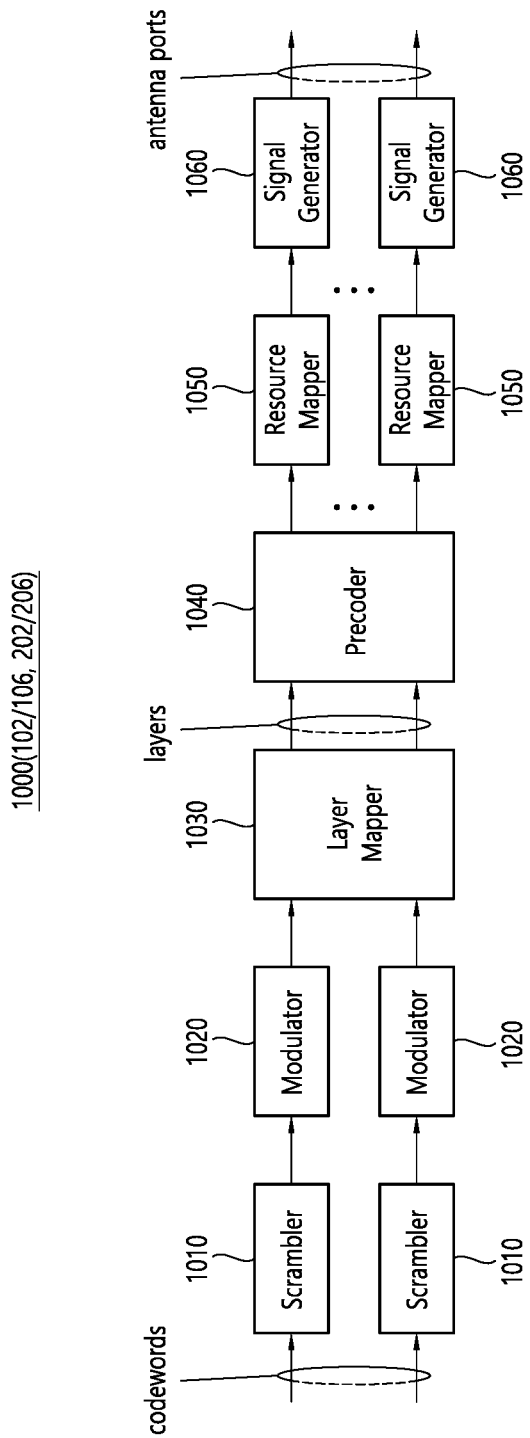
FIG. 17 shows a signal process circuit for a transmission signal, based on an embodiment of the present disclosure.

FIG. 17 shows a signal process circuit for a transmission signal, based on an embodiment of the present disclosure. The embodiment of FIG. 17 may be combined with various embodiments of the present disclosure.

Referring to FIG. 17, a signal processing circuit 1000 may include scramblers 1010, modulators 1020, a layer mapper 1030, a precoder 1040, resource mappers 1050, and signal generators 1060. An operation/function of FIG. 17 may be performed, without being limited to, the processors 102 and 202 and/or the transceivers 106 and 206 of FIG. 16. Hardware elements of FIG. 17 may be implemented by the processors 102 and 202 and/or the transceivers 106 and 206 of FIG. 16. For example, blocks 1010 to 1060 may be implemented by the processors 102 and 202 of FIG. 16. Alternatively, the blocks 1010 to 1050 may be implemented by the processors 102 and 202 of FIG. 16 and the block 1060 may be implemented by the transceivers 106 and 206 of FIG. 16.

Codewords may be converted into radio signals via the signal processing circuit 1000 of FIG. 17. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 17. For example, the wireless devices (e.g., 100 and 200 of FIG. 16) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 18:
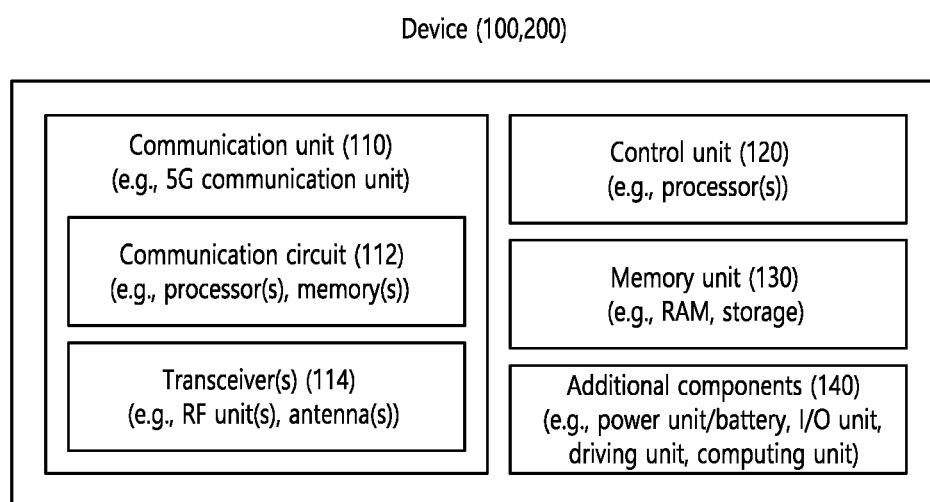
FIG. 18 shows another example of a wireless device, based on an embodiment of the present disclosure.

FIG. 18 shows another example of a wireless device, based on an embodiment of the present disclosure. The wireless device may be implemented in various forms according to a use-case/service (refer to FIG. 15). The embodiment of FIG. 18 may be combined with various embodiments of the present disclosure.

Referring to FIG. 18, wireless devices 100 and 200 may correspond to the wireless devices 100 and 200 of FIG. 16 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 16. For example, the transceiver(s) 114 may include the one or more transceivers 106 and 206 and/or the one or more antennas 108 and 208 of FIG. 16. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 15), the vehicles (100b-1 and 100b-2 of FIG. 15), the XR device (100c of FIG. 15), the hand-held device (100d of FIG. 15), the home appliance (100e of FIG. 15), the IoT device (100f of FIG. 15), a digital broadcast terminal, a hologram device, a public safety device, an MTC device, a medicine device, a fintech device (or a finance device), a security device, a climate/environment device, the AI server/device (400 of FIG. 15), the BSs (200 of FIG. 15), a network node, etc. The wireless device may be used in a mobile or fixed place according to a use-example/service.

In FIG. 18, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 18 will be described in detail with reference to the drawings.

Figure 19:
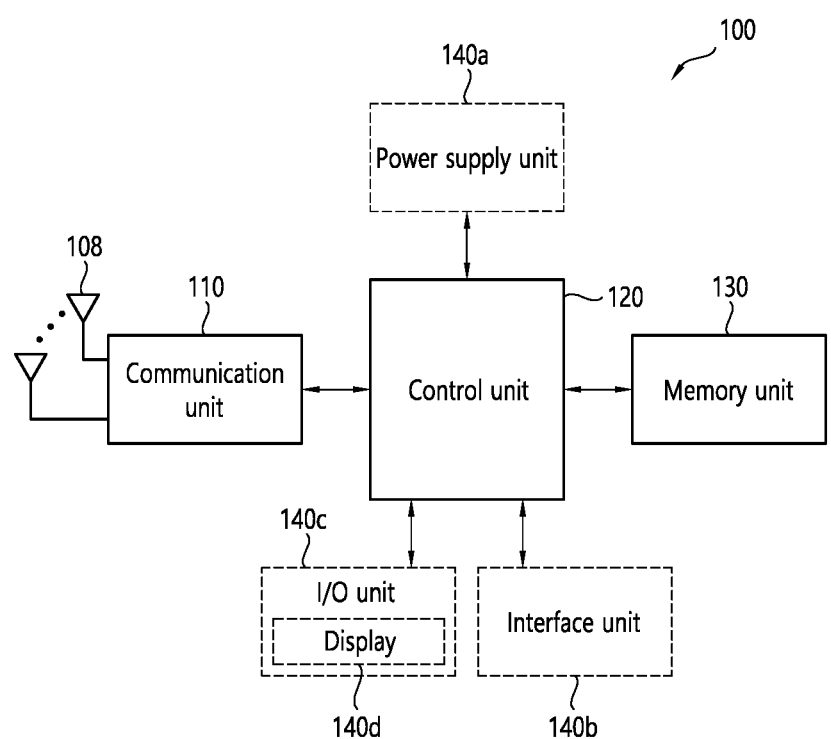
FIG. 19 shows a hand-held device, based on an embodiment of the present disclosure.

FIG. 19 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT). The embodiment of FIG. 19 may be combined with various embodiments of the present disclosure.

Referring to FIG. 19, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 18, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 20:
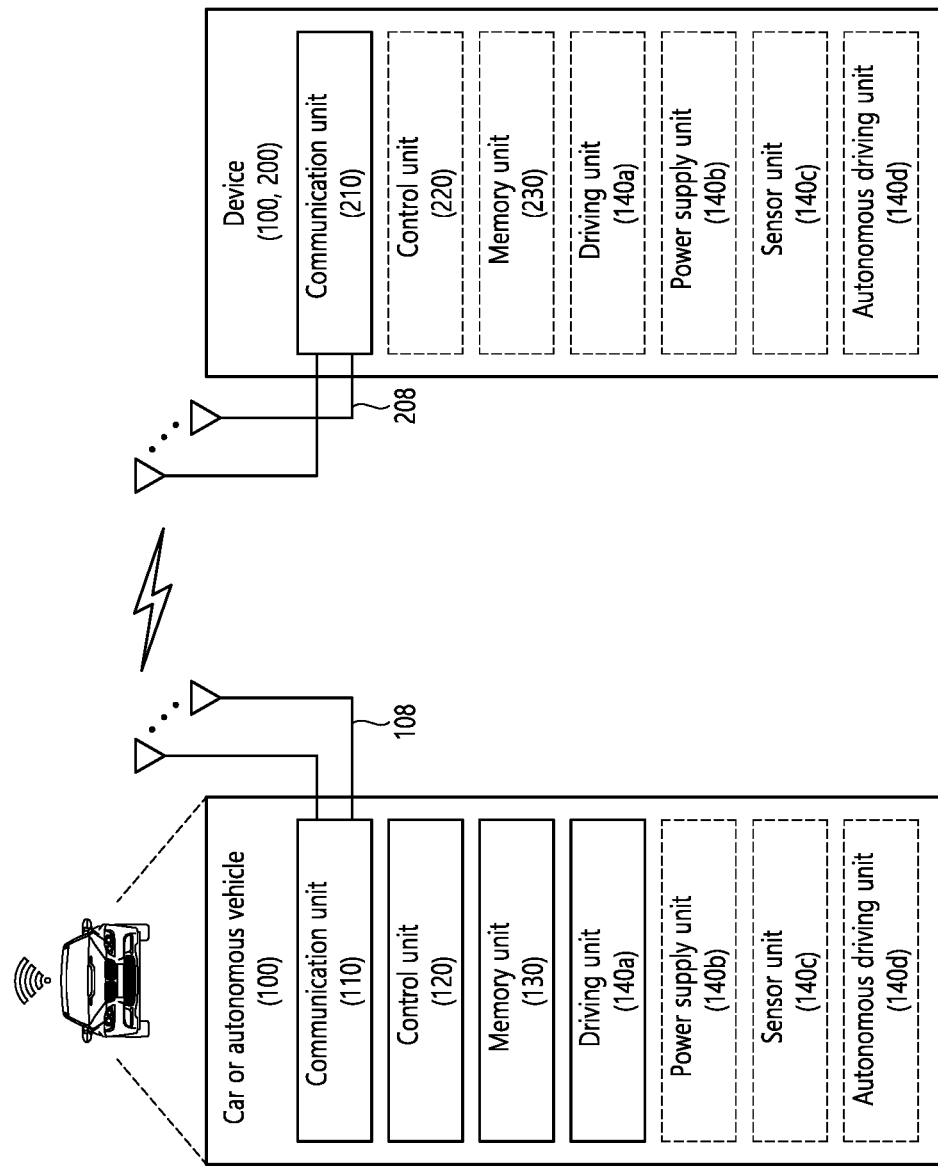
FIG. 20 shows a vehicle or an autonomous vehicle, based on an embodiment of the present disclosure.

FIG. 20 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc. The embodiment of FIG. 20 may be combined with various embodiments of the present disclosure.

Referring to FIG. 20, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 18, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing, by a first apparatus, wireless communication, the method comprising:
    transmitting a first sidelink (SL) discontinuous reception (DRX) configuration related to a first service to a second apparatus,
        wherein the first SL DRX configuration includes information related to a timer for a first active time and information related to a first DRX cycle;
    receiving a second SL DRX configuration related to a second service,
        wherein the second SL DRX configuration includes information related to a timer for a second active time and information related to a second DRX cycle;
    determining a time duration in which the first active time and the second active time overlap;
    comparing a first priority value related to the first service to be transmitted within the overlapping time duration and a second priority value related to the second service to be received within the overlapping time duration;
    performing SL transmission or SL reception of a service related to a smaller priority value among the first priority value and the second priority value, within the overlapping time duration; and
    performing SL transmission or SL reception of a service related to a greater priority value among the first priority value and the second priority value, outside the overlapping time duration.

2. The method of claim 1, wherein the SL transmission or the SL reception of the service related to the greater priority value among the first priority value and the second priority value is performed in a sleep duration of a SL DRX configuration related to the greater priority value among the first priority value and the second priority value.

3. The method of claim 1, wherein the SL transmission or the SL reception of the service related to the greater priority value among the first priority value and the second priority value is performed outside the overlapping time duration of the second active time.

4. The method of claim 1, wherein the step of transmitting the first SL DRX configuration related to the first service to the second apparatus includes:
    configuring the first SL DRX configuration so that the first active time and the second active time do not overlap.

5. The method of claim 4, wherein the step of transmitting the first SL DRX configuration related to the first service to the second apparatus further includes:
    receiving, from the second apparatus, information for configuring the first active time and the second active time not to overlap.

6. The method of claim 1, wherein the timer for the first active time includes at least one of a first SL DRX on-duration timer, a first SL DRX inactivity timer, or a first SL DRX retransmission timer.

7. The method of claim 6, wherein the first active time is a time during which at least one of the first SL DRX on-duration timer, the first SL DRX inactivity timer, or the first SL DRX retransmission timer is running.

8. The method of claim 1, wherein the timer for the second active time includes at least one of a second SL DRX on-duration timer, a second SL DRX inactivity timer, or a second SL DRX retransmission timer.

9. The method of claim 8, wherein the second active time is a time during which at least one of the second SL DRX on-duration timer, the second SL DRX inactivity timer, or the second SL DRX retransmission timer is running.

10. The method of claim 1, wherein the first SL DRX configuration is a default SL DRX configuration or a common SL DRX configuration.

11. The method of claim 1, wherein the second SL DRX configuration is a default SL DRX configuration or a common SL DRX configuration.

12. The method of claim 1, wherein the first SL DRX configuration is an SL DRX configuration related to a pair of the first apparatus and the second apparatus.

13. The method of claim 1, wherein the second SL DRX configuration is an SL DRX configuration related to a pair of the first apparatus and the second apparatus.

14. A first apparatus for performing wireless communication, the first apparatus comprising:
    one or more memories storing instructions;
    one or more transceivers; and
    one or more processors connected to the one or more memories and the one or more transceivers, wherein the one or more processors execute the instructions to:
        transmit a first sidelink (SL) discontinuous reception (DRX) configuration related to a first service to a second apparatus,
            wherein the first SL DRX configuration includes information related to a timer for a first active time and information related to a first DRX cycle;
        receive a second SL DRX configuration related to a second service,
            wherein the second SL DRX configuration includes information related to a timer for a second active time and information related to a second DRX cycle;
        determine a time duration in which the first active time and the second active time overlap;
        compare a first priority value related to the first service to be transmitted within the overlapping time duration and a second priority value related to the second service to be received within the overlapping time duration;
        perform SL transmission or SL reception of a service related to a smaller priority value among the first priority value and the second priority value, within the overlapping time duration; and
        perform SL transmission or SL reception of a service related to a greater priority value among the first priority value and the second priority value, outside the overlapping time duration.

15. An apparatus configured to control a first user equipment (UE), the apparatus comprising:
    one or more processors; and
    one or more memories operably connectable to the one or more processors and storing instructions, wherein the one or more processors execute the instructions to:
        transmit a first sidelink (SL) discontinuous reception (DRX) configuration related to a first service to a second UE,
            wherein the first SL DRX configuration includes information related to a timer for a first active time and information related to a first DRX cycle;
        receive a second SL DRX configuration related to a second service,
            wherein the second SL DRX configuration includes information related to a timer for a second active time and information related to a second DRX cycle;
        determine a time duration in which the first active time and the second active time overlap;
        compare a first priority value related to the first service to be transmitted within the overlapping time duration and a second priority value related to the second service to be received within the overlapping time duration;

perform SL transmission or SL reception of a service related to a smaller priority value among the first priority value and the second priority value, within the overlapping time duration; and perform SL transmission or SL reception of a service related to a greater priority value among the first priority value and the second priority value, outside the overlapping time duration.

\* \* \* \* \*